(12) United States Patent
Zhou et al.

(10) Patent No.: US 7,672,042 B2
(45) Date of Patent: Mar. 2, 2010

(54) FAST DYNAMIC GAIN CONTROL IN AN OPTICAL FIBER AMPLIFIER

(75) Inventors: Xiang Zhou, Middletown, NJ (US); Martin Birk, Belford, NJ (US)

(73) Assignee: AT&T Corporation, Bedminster, NJ (US)

( * ) Notice: Subject to any disclaimer, the term of this patent is extended or adjusted under 35 U.S.C. 154(b) by 0 days.

(21) Appl. No.: 11/273,868

(22) Filed: Nov. 15, 2005

(65) Prior Publication Data
US 2006/0187538 A1   Aug. 24, 2006

Related U.S. Application Data

(60) Provisional application No. 60/656,111, filed on Feb. 24, 2005.

(51) Int. Cl.
  *H04B 10/17* (2006.01)
  *H04B 10/12* (2006.01)
(52) U.S. Cl. .................... 359/334; 359/337.11
(58) Field of Classification Search .............. 359/334, 359/341.3, 337.11
  See application file for complete search history.

(56) References Cited

U.S. PATENT DOCUMENTS

| | | | |
|---|---|---|---|
| 6,236,500 B1 * | 5/2001 | Suzuki et al. | 359/337.5 |
| 6,417,965 B1 * | 7/2002 | Ye et al. | 359/341.41 |
| 6,441,950 B1 * | 8/2002 | Chen et al. | 359/334 |
| 6,498,677 B1 | 12/2002 | Sun et al. | |
| 6,510,000 B1 * | 1/2003 | Onaka et al. | 359/334 |
| 6,574,037 B2 | 6/2003 | Islam et al. | |
| 6,624,926 B1 * | 9/2003 | Hayashi et al. | 359/334 |
| 6,624,927 B1 | 9/2003 | Wong et al. | |
| 6,687,049 B1 | 2/2004 | Sulhoff et al. | |
| 6,690,504 B1 * | 2/2004 | Nagel et al. | 359/334 |
| 6,958,856 B2 * | 10/2005 | Inoue et al. | 359/334 |

(Continued)

FOREIGN PATENT DOCUMENTS

EP   1248 334   10/2002

(Continued)

OTHER PUBLICATIONS

Yihong, Chen et al., "Bi-directionally pumped broadband Raman amplifier," *ECOC*, Sep. 2001, pp. 230-231, Freehold, NJ.

(Continued)

*Primary Examiner*—Eric Bolda
(74) *Attorney, Agent, or Firm*—Banner & Witcoff, Ltd.

(57) ABSTRACT

The present invention provides methods and apparatuses for controlling a gain of an optical fiber amplifier. Gain circuitry operates in an opened loop configuration and uses a predetermined function relating a power variation of at least one wavelength region with a pump power adjustment for at least one optical pump. Two approximate linear relationships between the input signal power variations and the required pump power adjustments are utilized in controlling the Raman fiber amplifier. Each approximate linear relationship includes at least one linear coefficient that relates a power variation for a specific wavelength region and a power adjustment of a specific Raman pump. The dynamic gain control technique is applicable to an Erbium-doped fiber/waveguide amplifier. Also, a dynamic gain control technique controls a backward-pumped Raman amplifier, in which the power variation is determined at one geographical location and the optical pumps are controlled at another geographical location.

14 Claims, 27 Drawing Sheets

U.S. PATENT DOCUMENTS

| | | | |
|---|---|---|---|
| 6,985,284 | B2 | 1/2006 | Denkin et al. |
| 7,142,356 | B2 | 11/2006 | Zhou et al. |
| 7,180,654 | B2 | 2/2007 | Sugaya et al. |
| 2002/0044343 | A1* | 4/2002 | Manzur ............... 359/337.11 |
| 2002/0054733 | A1 | 5/2002 | Kagi |
| 2002/0186456 | A1* | 12/2002 | Inoue et al. ............... 359/334 |
| 2003/0117694 | A1 | 6/2003 | Sobe et al. |
| 2003/0147124 | A1 | 8/2003 | Inoue |
| 2003/0210457 | A1* | 11/2003 | Emori et al. ............... 359/334 |
| 2004/0052453 | A1 | 3/2004 | Mao et al. |
| 2004/0080812 | A1 | 4/2004 | Sugaya et al. |
| 2004/0240038 | A1* | 12/2004 | Kado et al. ............... 359/334 |
| 2005/0219681 | A1 | 10/2005 | Hayashi |
| 2005/0237601 | A1* | 10/2005 | Nakaji ............... 359/334 |

FOREIGN PATENT DOCUMENTS

| | | |
|---|---|---|
| WO | 2004032383 A1 | 4/2004 |

OTHER PUBLICATIONS

Kado, Soko et al., "Broadband flat-noise Raman amplifier using low-noise bi-directionally pumping sources," *ECOC*, 2001, pp. 1-2, Kanagawa, Japan.

Essiambre, Rene-Jean et al. "Design of Bidirectionally Pumped Fiber Amplifiers Generating Double Rayleigh Backscattering," *IEEE Photonics Technology Letters*, Jul. 2002, pp. 914-916, vol. 14, No. 7, USA.

Bromage, J. et al., "High co-directional Raman gain for 200-km spans, enabling 40 × 10.66 Gb/s transmission over 2400 km," *OFC*, 2003, pp. PD24-1 to PD24-3, Holmdel, NJ.

Chen, C.J. et al., "Control of transient effects in distributed and lumped Raman amplifier," *Electronic Letters*, Oct. 2001, pp. 1304-1305, vol. 37, No. 21, USA.

Wang, L.L., et al., "Gain transients in co-pumped and counter-pumped Raman amplifiers," *IEEE Photonics Technology Letters*, May 2003, pp. 664-666, vol. 15, No. 5, USA.

Zhou, Xiang et al., "Theoretical Investigation of fiber Raman amplifier with dynamic gain control", *OFC*, 2001, pp. WDD17-1-WDD17-3, Singapore.

Bolognini, G. et al., "Transient effects in gain-clamped discrete Raman amplifier cascades", *IEEE Photonics Technology Letters*, Jan. 2004, pp. 66-68, vol. 16, No. 1, USA.

* cited by examiner

FAST DYNAMIC GAIN CONTROL IN AN OPTICAL FIBER AMPLIFIER

This application claims priority to provisional U.S. Application Ser. No. 60/656,111 ("Fast dynamic gain control in an optical fiber amplifier"), filed Feb. 24, 2005.

FIELD OF THE INVENTION

The present invention relates to dynamically controlling the gain of an optical fiber amplifier.

BACKGROUND OF THE INVENTION

Distributed Raman fiber amplification has been proven to be a powerful technique to improve the optical signal to noise ratio (OSNR) margin of long haul wavelength-division multiplexing (WDM) system. The discrete Raman fiber amplifier is also an effective method to compensate the loss of the dispersion fiber module and/or provide extra bandwidth. A Raman fiber amplifier can be configured either as a forward-pumped Raman fiber amplifier (RFA) or as a backward-pumped RFA. It has been shown that using both forward-pumped RFA and backward-pumped RFA can achieve better noise performance and Rayleigh crosstalk performance than purely backward pumping, and therefore enables very long span WDM transmission. On the other hand, optical communication is evolving from current point-to-point systems to dynamic optical networks. In a dynamic optical network, channels will be added and dropped to meet the varying capacity demands. In addition, accidental loss of channels due to fiber cut or from amplifier failure will also lead to variation of the overall optical power in the transmission system. To keep the power of the surviving channels at a constant level, fast dynamic gain control is indispensable for both forward-pumped distributed/discrete RFA and backward-pumped distributed/discrete RFA, as well as EDFA's. Two control approaches have been demonstrated in recent years. For the first approach, the Raman pump powers are controlled by a closed negative feedback loop, in which the signal gains are continuously monitored and compared with the target gain. The error control signal is usually generated through a proportional, integral and differential (PID) control algorithm. FIG. 1A shows dynamic gain control apparatus 100 for a multi-wavelength forward-pumped Raman fiber amplifier according to prior art. FIG. 1B shows dynamic gain control apparatus 150 for a multi-wavelength Backward-pumped Raman fiber amplifier according to prior art. This approach exhibits a typical control speed of tens to several hundred microseconds. The corresponding speed may be acceptable for a backward-pumped distributed RFA. This approach is not typically fast enough for a forward-pumped RFA (either distributed or discrete), and many times even not fast enough for a backward-pumped discrete RFA, which typically has much shorter fiber length than a distributed RFA. This observation is due to the fact that the gain transients of a forward-pumped RFA are decided by the walk-off time (sub-µs) between the signal and the pump while a backward-pumped RFA is decided by the transit time through the fiber (hundreds of µs for a typical distributed RFA).

The second demonstrated method is referred to the all-optical gain clamping technique, which is based on a closed optical feedback loop. However this method introduces noise degradation and is not faster than the first method due to the same nature (closed feedback loop). With another approach, a dynamic gain control scheme based on a predetermined table between the detected output signal power variations and the required pump power adjustments has been proposed for a backward-pumped RFA. Because the look-up table varies with the load (i.e., the power of the input signals), not only is an extra control loop needed to detect the load, but also numerous tables are required to be stored in the control circuits. This not only increases its implementation complexity/cost, but also slows its capability of dynamic gain control.

There is a real need in the art for a fast and efficient dynamic gain control technique suitable for both forward-pumped distributed/discrete RFA and backward-pumped discrete RFA as well as other types of optical fiber amplifiers such as Erbium doped fiber amplifiers (EDFA's).

BRIEF SUMMARY OF THE INVENTION

The present invention provides methods and apparatuses for controlling a gain of an optical fiber amplifier. Gain circuitry operates in an opened loop configuration and uses a predetermined function relating a power variation of at least one wavelength region with a pump power adjustment for at least one optical pump.

With one aspect of the invention, two approximate linear relationships between the input signal power variations and the required pump power adjustments are utilized in controlling a Raman fiber amplifier (RFA). The RFA may be configured as either a forward-pumped RFA or a backward-pumped RFA using one of the two approximate linear relationships.

With another aspect of the invention, each approximate linear relationship includes at least one linear coefficient that relates a power variation for a specific wavelength region and a power adjustment of a specific Raman pump.

With another aspect of the invention, each linear coefficient of an approximate linear relationship is determined by experimentally observing or simulating an optical fiber system. Optical signal channels are configured so that the power variations of all of the wavelength regions may be ignored except for a specific wavelength region. A corresponding linear coefficient is determined by dividing the corresponding power adjustment for the specific pump by the power variation of the specific wavelength region.

With another aspect of the invention, a dynamic gain control technique for both a forward-pumped distributed/discrete RFA and a backward-pumped discrete RFA enables the pump power adjustment to be completed in only one-step within a very short period of time (<<1 µs). For a forward-pumped RFA, the dynamic gain control technique enables the powers of the optical pumps to be adjusted synchronously with the input signal power and therefore perform fast dynamic gain control.

With another aspect of the invention, the dynamic gain control technique is also applicable to an Erbium-doped fiber/waveguide amplifier (EDFA/EDWA).

With another aspect of the invention, a dynamic gain control technique controls a backward-pumped Raman amplifier, in which the signal power variation is determined at one geographical location and the optical pumps are controlled at another geographical location.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Definitions for the following terms are included to facilitate an understanding of the detailed description.

Optical fiber amplifier—a device to amplify an optical signal from an optical fiber facility without converting the signal from optical to electrical back again to optical energy.

Optical pump—a shorter wavelength laser that is used to pump a length of optical fiber with energy to provide amplification of one or more longer wavelengths.

Figure 1A:
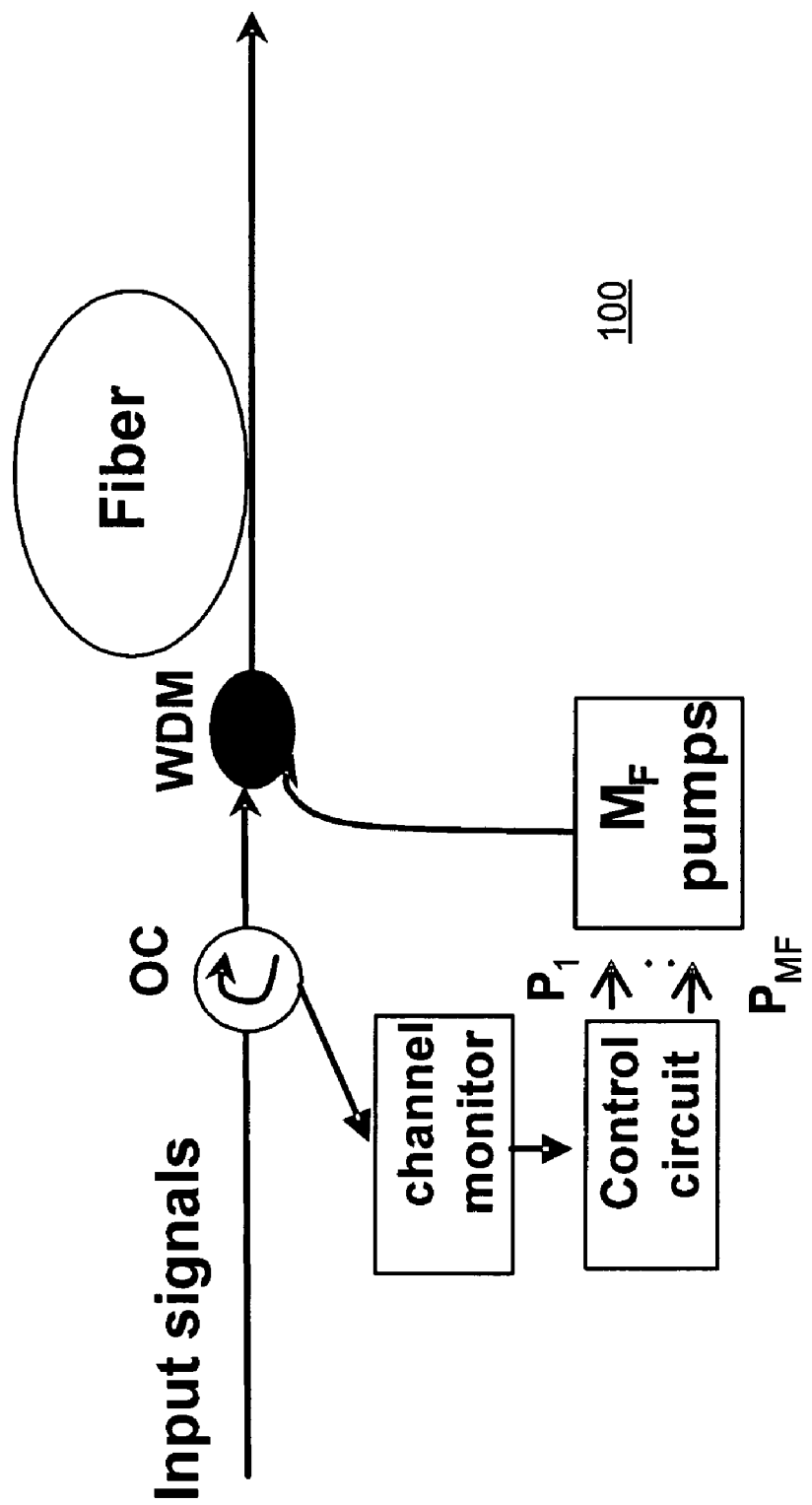
FIG. 1A shows dynamic gain control method for a multi-wavelength forward-pumped Raman fiber amplifier according to prior art.
Figure 1B:
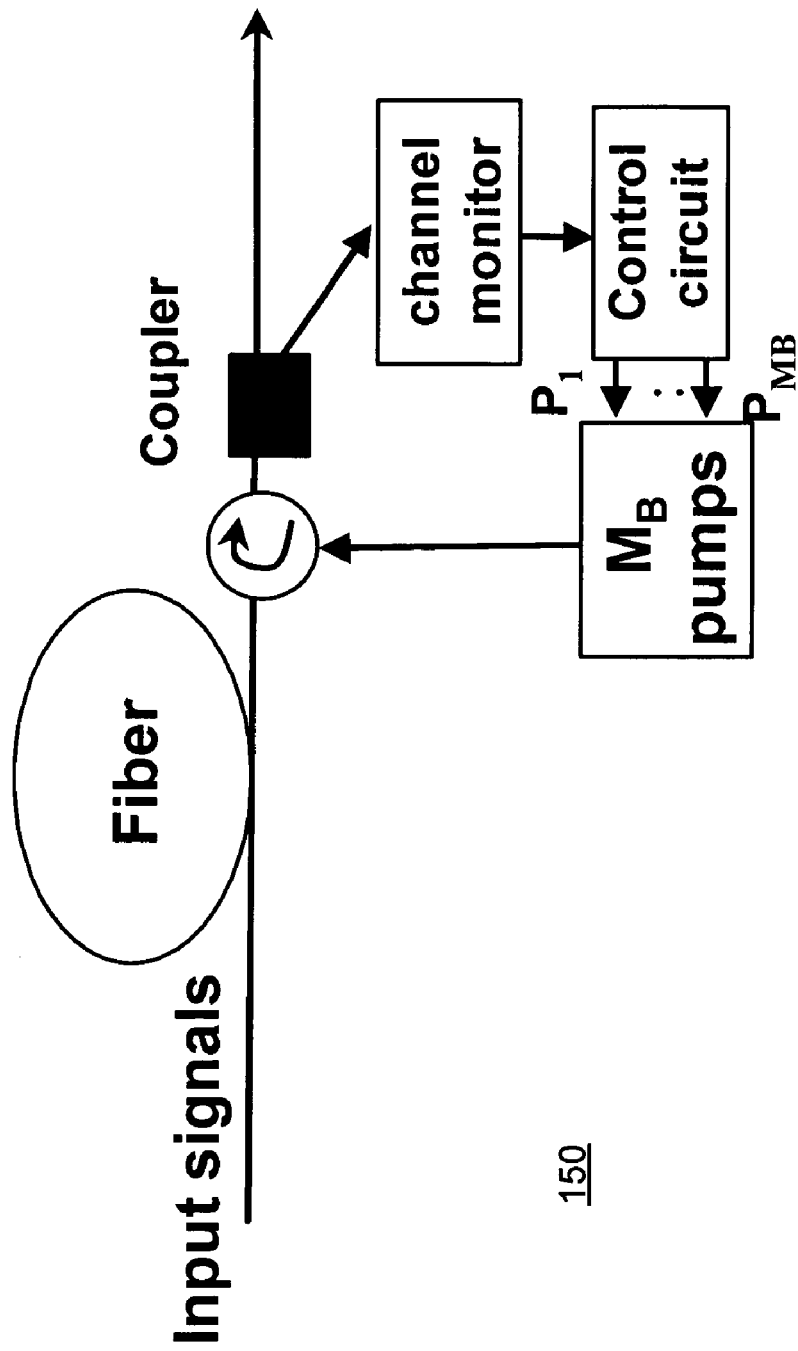
FIG. 1B shows dynamic gain control method for a multi-wavelength Backward-pumped Raman fiber amplifier according to prior art.
Figure 2:
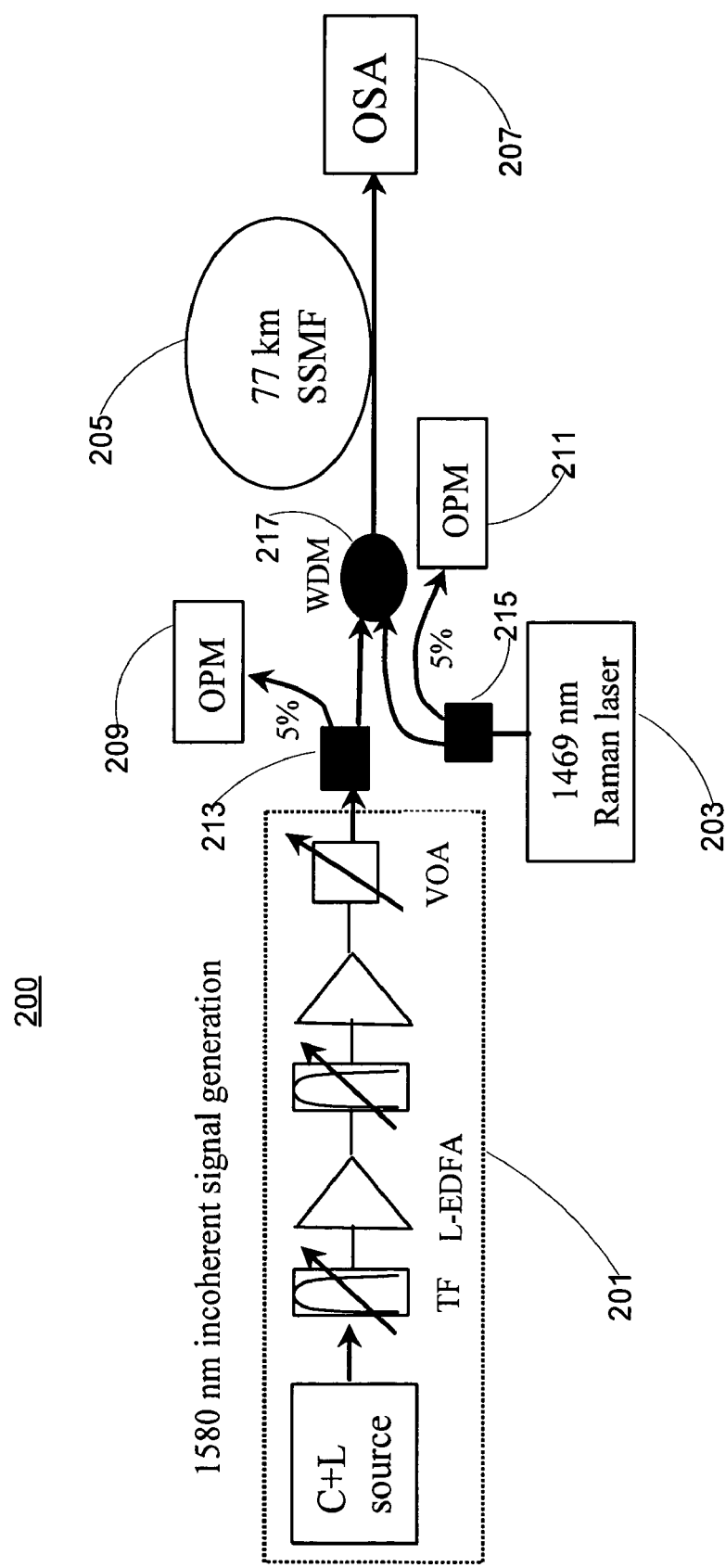
FIG. 2 shows an experimental setup for a forward-pumped Raman fiber amplifier in accordance with an embodiment of the invention.

FIG. 2 shows an experimental setup 200 for a forward-pumped Raman fiber amplifier in accordance with an embodiment of the invention. Experimental setup 200 comprises signal generator 201 coupler 213, coupler 215, multiplexer 217, fiber facilities 205, Raman laser 203, optical power meter (OPM) 209, OPM 211, and optical spectrum analyzer (OSA) 207. Coupler 213 provides a portion (approximately 5%) of the generated power from signal generator 201 to OPM 209. Raman laser injects power at approximately 1469 nm through wavelength-division multiplexer (WDM) 217 to amplify the generated signal. The injected power from Raman laser 203 is measured by OPM 211 through coupler 215. The resulting signal is transmitted through fiber 205 and analyzed by OSA 207.

Experimental results from experimental setup 200 suggests that there are two approximate linear relationships between the input signal power variations and the required pump power adjustments for both forward-pumped RFA and backward-pumped RFA. (The two approximate linear relationships will be discussed.) Consequently, in accordance with an embodiment of the invention, a dynamic gain control technique for both forward-pumped distributed/discrete RFA and backward-pumped discrete RFA allows the pump power adjustments to be completed in only one step within a very short period of time (<<1 µs) while operating in an opened loop configuration. (Prior art methods based on a closed feedback loop typically need more than 3 steps to stabilize the gain.) For a forward-pumped distributed/discrete RFA, the present method allows the pump powers to be adjusted synchronously with the input signal power variation. (Prior art methods typically detect the output/backscattered signal variations and consequently require more time to stabilize the closed loop control.)

When a Raman fiber amplifier is used in a dynamic optical network, the pump power needs to be adjusted accordingly when the input signal power varies in order to maintain a constant gain. Experimental results from experimental setup 200 are indicative of a relationship between the required pump power adjustment and the input signal power variation in a forward-pumped RFA. Experimental setup 200 includes fiber facilities 205, which comprises approximately 77 km of standard single mode fiber (SSMF), which functions as the transmission fiber. Raman pump comprises Raman fiber laser 203 (1469 nm with 3 dB spectral width≅1 nm) and the signal is a narrow-band filtered ASE (amplified spontaneous emission) source (1580 nm with 3 dB spectral width≅1 nm). Both the input pump power and the input signal power are monitored by optical power meters 209 and 211 while the Raman gain is measured through OSA 207.

Figure 3:
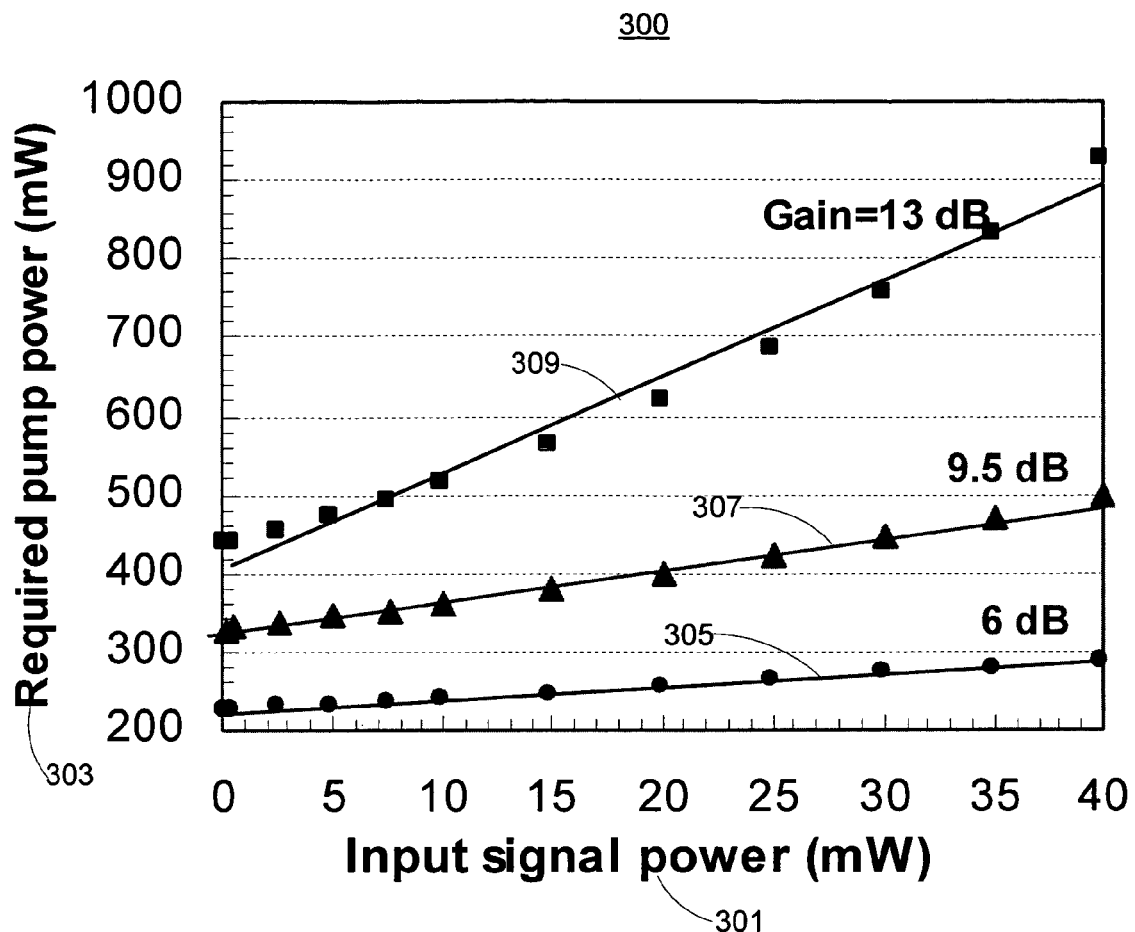
FIG. 3 shows Raman pump powers in a linear scale as a function of the input signal power in a linear scale for a forward-pumped Raman fiber amplifier in accordance with an embodiment of the invention.

FIG. 3 shows a function 300 in which Raman pump power in a linear scale is a function (relationship) of the input signal power in a linear scale for a forward-pumped Raman fiber amplifier in accordance with an embodiment of the invention. The required Raman pump power 303 as a function of the input signal power 301 (0.001 mW to 40 mW) for various target various Raman gains (6 dB, 9.5 dB and 13 dB) corresponding to plots 305, 307, and 309, respectively.

Figure 4:
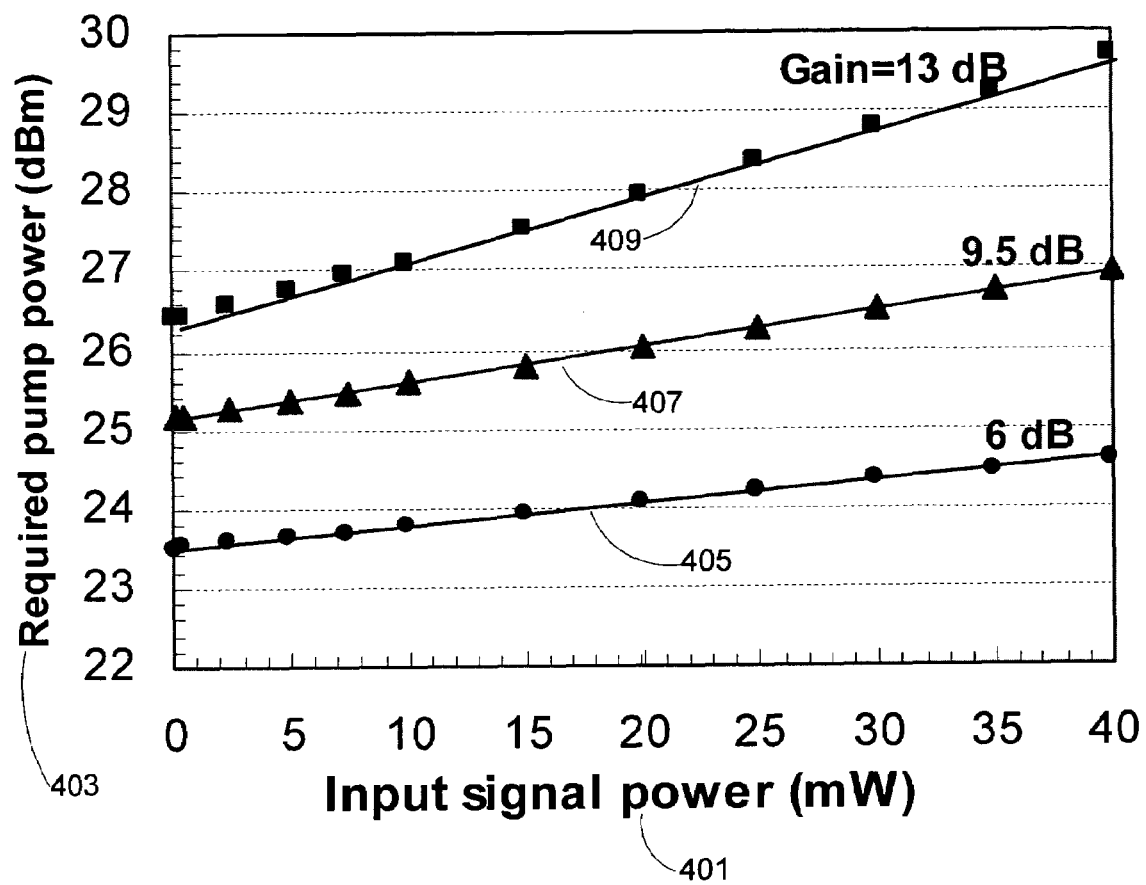
FIG. 4 shows Raman pump powers in a decibel scale as a function of the input signal power in a linear scale for a forward-pumped Raman fiber amplifier in accordance with an embodiment of the invention.

FIG. 4 shows a function 400 (that is associated with function 300 as shown in FIG. 3), in which Raman pump power 403 is shown in a decibel scale as a function of the input signal power 401 as shown in a linear scale for a forward-pumped Raman fiber amplifier in accordance with an embodiment of the invention. The required Raman pump power 403 as a function of the input signal power 401 (0.001 mW to 40 mW) for various target various Raman gains (6 dB, 9.5 dB and 13 dB) corresponding to plots 405, 407, and 409, respectively.

As shown in FIGS. 3 and 4, input signal powers 301 and 401 are shown in linear scale. One observes that the required pump power 303 is described by an approximate linear function of the input signal power 301 if the Raman gain is not substantially large as shown in FIG. 3. If one expresses the required pump power in a decibel scale (as shown in FIG. 4) while maintaining the input signal power in a linear scale, the linear relationship (corresponding to plots 405, 407, and 409) appears to hold not only for a relatively small Raman gain but also appears to hold for a relatively large Raman gain (as high as 13 dB).

In experimental setup 200 only one Raman pump and one signal are considered. However, embodiments of the invention utilize linear relationships (similar to the two linear relations as shown in FIGS. 3 and 4) for a forward-pumped RFA with multiple signals and multiple Raman pumps as long as the Raman interactions between pump and pump, between pump and signal, and between signal and signal are not too strong (the underlying reason is due to the same nature of the three Raman interactions).

In the following discussion, one assumes that there are M Raman pumps and N signal channels. In an embodiment of the invention, the N signals are partitioned into K wavelength regions. In an embodiment of the invention, one selects one of two approximate linear functions describing the relationship between the required individual pump power adjustments (relative to a reference point, e.g., half-load with uniform channel pattern) and the input signal power variations in the K wavelength regions. The two approximate linear functions (relationships) are then given by:

$$\Delta P_L(j) \approx \sum_{k=1}^{K} T_{LL}(j,k) \Delta S_L(k) \quad \text{(EQ. 1)}$$

$$\Delta P_d(j) \approx \sum_{k=1}^{K} T_{dL}(j,k) \Delta S_L(k) \quad \text{(EQ. 2)}$$

where $\Delta P_L(j)$, $\Delta P_d(j)$ denote the required power adjustment of the $j^{th}$ pump in linear scale and in decibel scale, respectively, and $\Delta S_L(k)$ denote the input signal power variation in linear scale in the $k^{th}$ wavelength region. For a specific target Raman gain profile, the linear coefficient $T_{LL}(j,k)$ and $T_{dL}(j,k)$ uniquely depend on the passive optical link parameters such as fiber length, fiber loss and Raman gain coefficient, and therefore can be predetermined either by direct measurement or by numerical simulation using the measured basic optical link parameters.

Numerical results suggest that EQ. 1 and EQ. 2 both hold if the target Raman gain is relatively small. With the increase of the target Raman gain it appears that EQ. 2 is preferable to describe the relationship between the required pump power adjustments and the input signal power variations, which agrees with experiments (as supported by experimental setup 200) in the case with only one pump and one signal.

Figure 5:
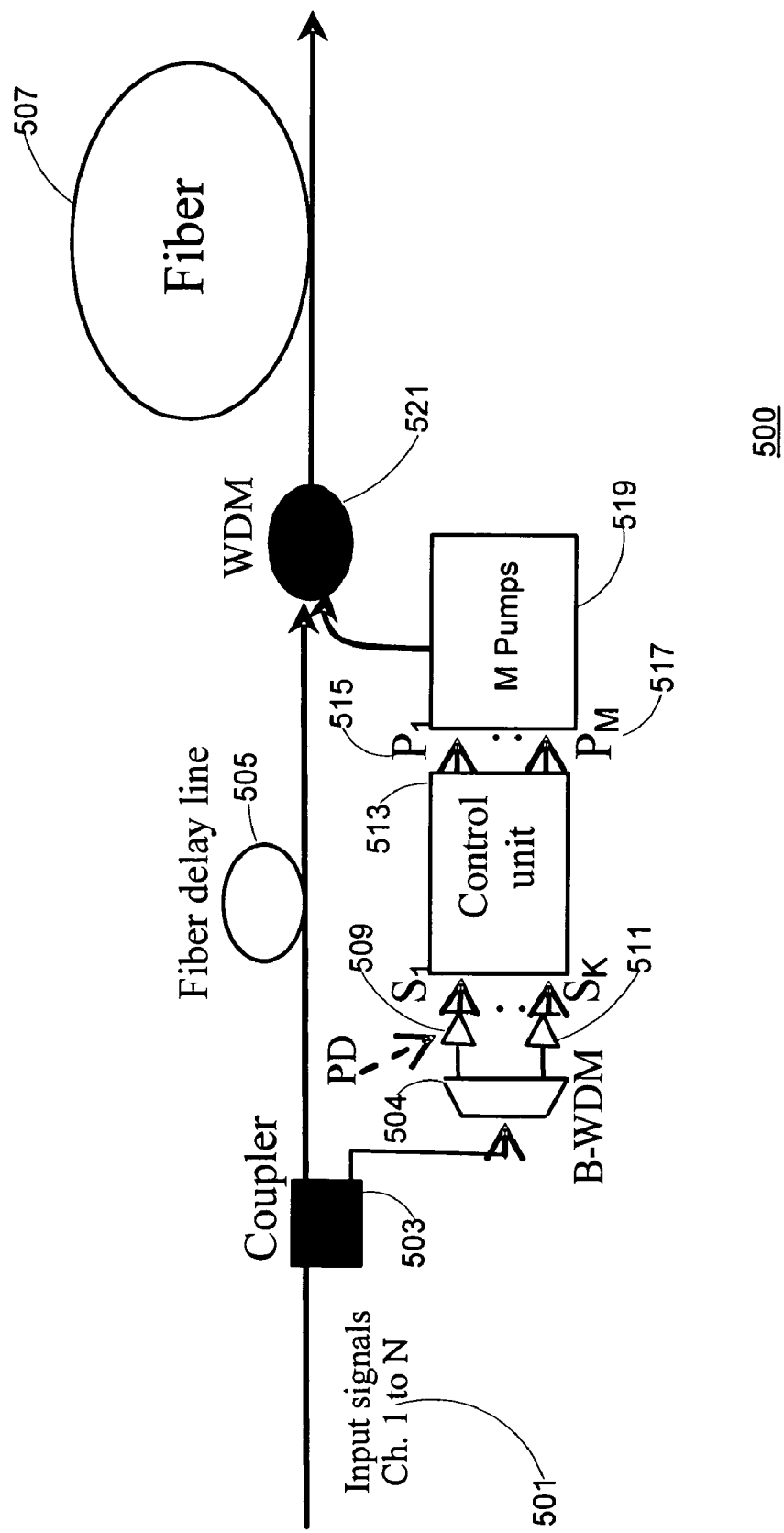
FIG. 5 shows a dynamic gain control circuit for a forward-pumped Raman fiber amplifier in accordance with an embodiment of the invention.

FIG. 5 shows a dynamic gain control circuit 500 for a forward-pumped Raman fiber amplifier in accordance with an embodiment of the invention. Dynamic gain control circuit 500 utilizes linear functions EQ. 1 or EQ. 2 as a deterministic control algorithm for a forward-pumped Raman fiber amplifier (RFA). Dynamic gain control circuit 500 comprises coupler 503, which couples input signals 501 to fiber delay line 505. A small part of the input signal power is coupled out (to monitor the input signal power variations) before it enters into the transmission fiber 507, which is partitioned into K wavelength regions by a 1×K band wavelength-division multiplexer (B-WDM) 504. (Alternatively, the embodiment may use a 1×K power splitter followed by K parallel bandpass filters.) The optical powers in the K wavelength regions (detected by K parallel photodetectors (PDs) 509-511) are used as the input parameters to control unit 513, which generates the required output pump powers 515-517 of the M Raman pumps 519 deterministically through a simple linear function calculations (either EQ. 1 or EQ. 2). Because the control algorithm (EQ. 1 or EQ. 2) is direct using an opened feedback loop configuration, the embodiment allows the pump power adjustments to be completed in only one step within a very short period of time (<<1 μs even for a common DSP). M Raman pumps 519 inject power into transmission fiber 507 through WDM 521.

While dynamic gain control circuit 500 shows only one amplifier stage, embodiments of the invention may support a plurality of amplifier stages, each amplifier stage being geographically located along a fiber optic transmission facility and designed in accordance with EQ. 1 or EQ. 2. Each amplifier stage may include forward-pumped RFA's, backward-pumped RFA's, or a combination of forward-pumped RFA's and backward-pumped RFA's.

By introducing a short delay between the transmission branch and the control branch with fiber delay line 505, the embodiment also allows the powers of the pump to be adjusted synchronously with the input signal power. The introduced delay by fiber delay line 505 is approximately equal to the time delay introduced by de-multiplexer 504, photodiodes 509-511, control unit 513, and pumps 519. As a result, the control technique of the embodiment is typically faster (sub-μs) than control techniques supported in the prior art (sub-ms).

Linear coefficient $T_{dL}(j,k)$, which is contained in EQ. 2, may be determined by the following procedure for a 80-channel WDM system. We assume that K=2 and we use half load with uniform channel patterns (1, 3, ... 79) as the reference point. First, only input signals at channels 41, 43 to 79 are configured and the corresponding required pump power adjustment $\Delta P_d(j)$ is found. $T_{dL}(j,1)$ is then given by $\Delta P_d(j)/\Delta S_L(1)$ due to the observation that $\Delta S_L(2)=0$. Second, only input signals at channel 1, 3 and 39 are configured and corresponding required pump power adjustment $\Delta P_d(j)$ is found. $T_{dL}(j,2)$ is then given by $\Delta P_d(j)/\Delta S_L(2)$ due to the observation that $\Delta S_L(1)=0$. The same process is also applicable for the case with K>2 or K=1. From FIGS. 7-14 one observes that the embodiment, as shown in FIG. 5, has the capability to suppress the Raman gain deviation of the surviving channel to be below 0.2 dB for a wide range of input signal spectral patterns. Without using gain control, however, the Raman gain deviation of the surviving channel can be as high as 2 dB with only one surviving channel and as high as −1.6 dB with full 80 channels.

Figure 6:
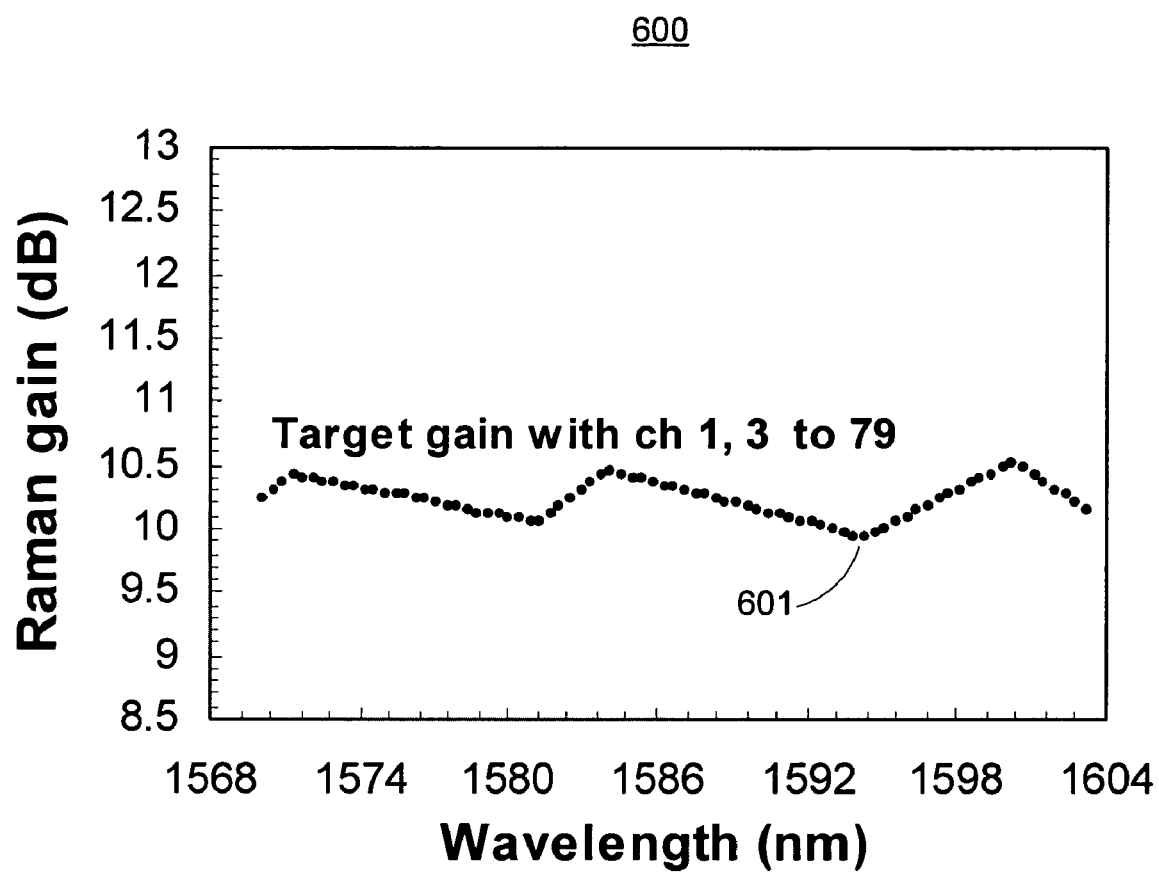
FIG. 6 shows a target Raman fiber amplifier gain profile in accordance with an embodiment of the invention.

FIG. 6 shows a target Raman fiber amplifier gain profile 600 in accordance with an embodiment of the invention. The chosen reference operation point is with half-load (40 channels) and uniform channel distribution (1, 3, 5, ... 79). As shown in FIG. 6, the Raman gain includes both the gain from the Raman pumps and the gain from the other signals. Choosing half load as the reference point is preferable than the commonly used reference point with full load because it allows the required maximum pump power adjustment to be reduced by half.

Figure 7:
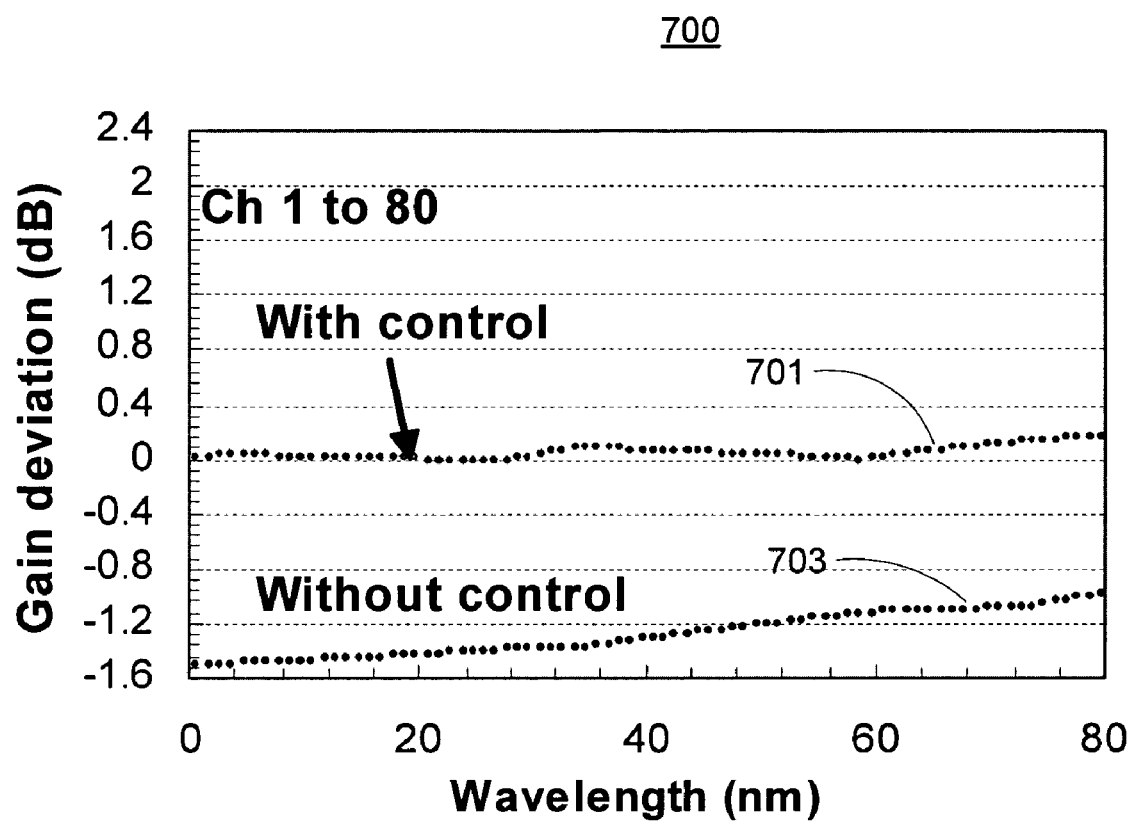
FIG. 7 shows a first example that compares gain deviation with and without dynamic gain control in accordance with an embodiment of the invention.

FIG. 7 shows a first example 700 that compares gain deviation with and without dynamic gain control with 80 active channels in accordance with an embodiment of the invention.

As previously discussed, FIGS. 7-14 (which show the simulated signal gain deviation of the surviving channel for a 50 GHz-spaced 80-channel L-band WDM system with a four-wavelength (1458, 1469, 1483 and 1503 nm) forward-pumped RFA) demonstrate the effectiveness of the embodiment shown in FIG. 5. The linear function (EQ. 2) is used as the control algorithm in the control unit. As a comparison, the signal gain deviation without gain control is also illustrated in FIGS. 7-14. 80 km of SSMF is used as the transmission fiber and the input signal power is chosen to be −3 dBm/channel. The tapped signal is divided into two wavelength regions (i.e., K=2), 1570-1584 nm, and 1584 to 1604 nm.

Figure 8:
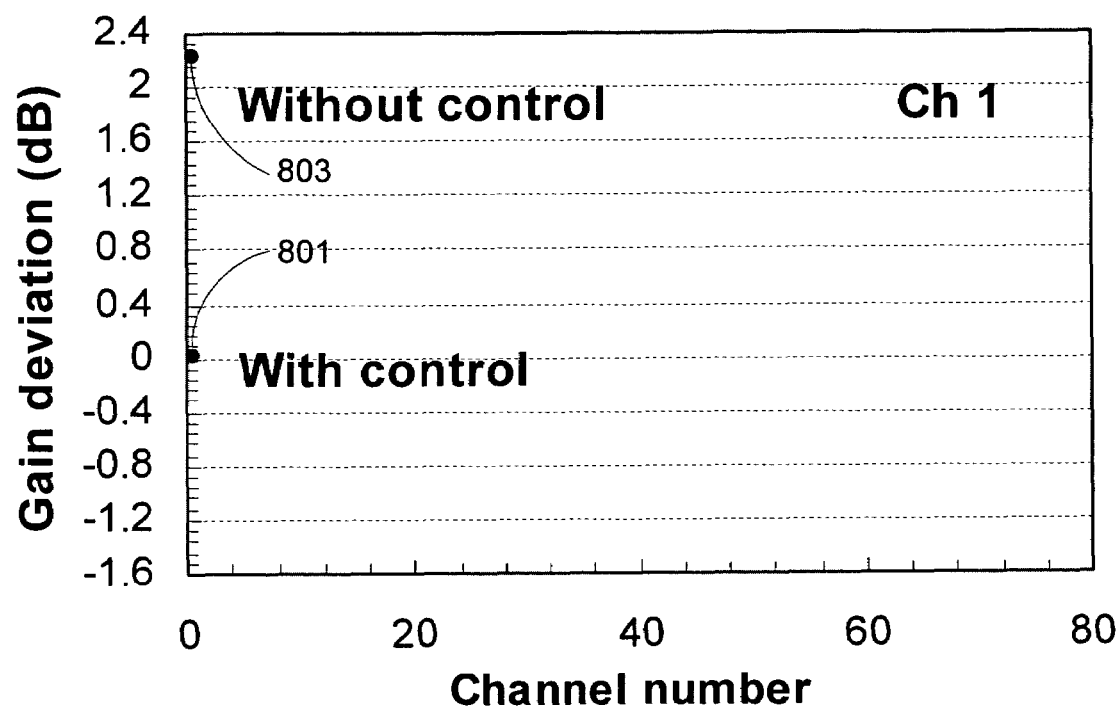
FIG. 8 shows a second example that compares gain deviation with and without dynamic gain control in accordance with an embodiment of the invention.
Figure 9:
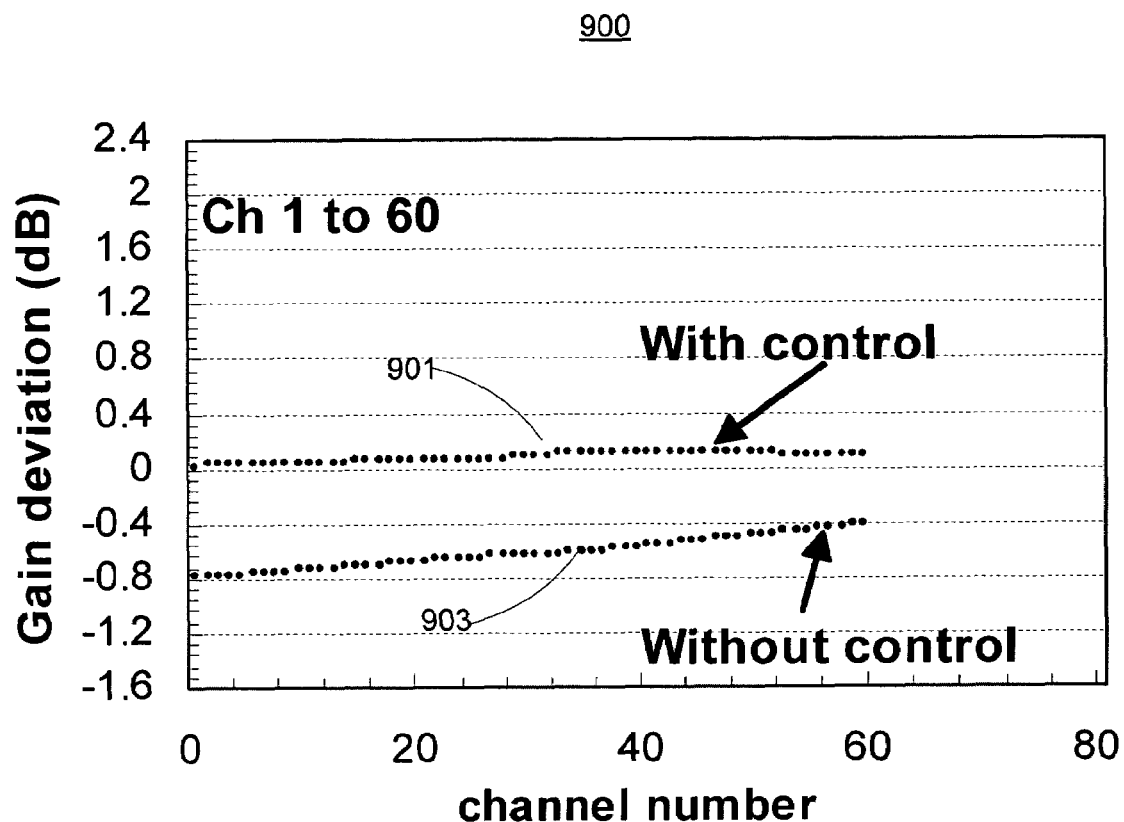
FIG. 9 shows a third example that compares gain deviation with and without dynamic gain control in accordance with an embodiment of the invention.
Figure 10:
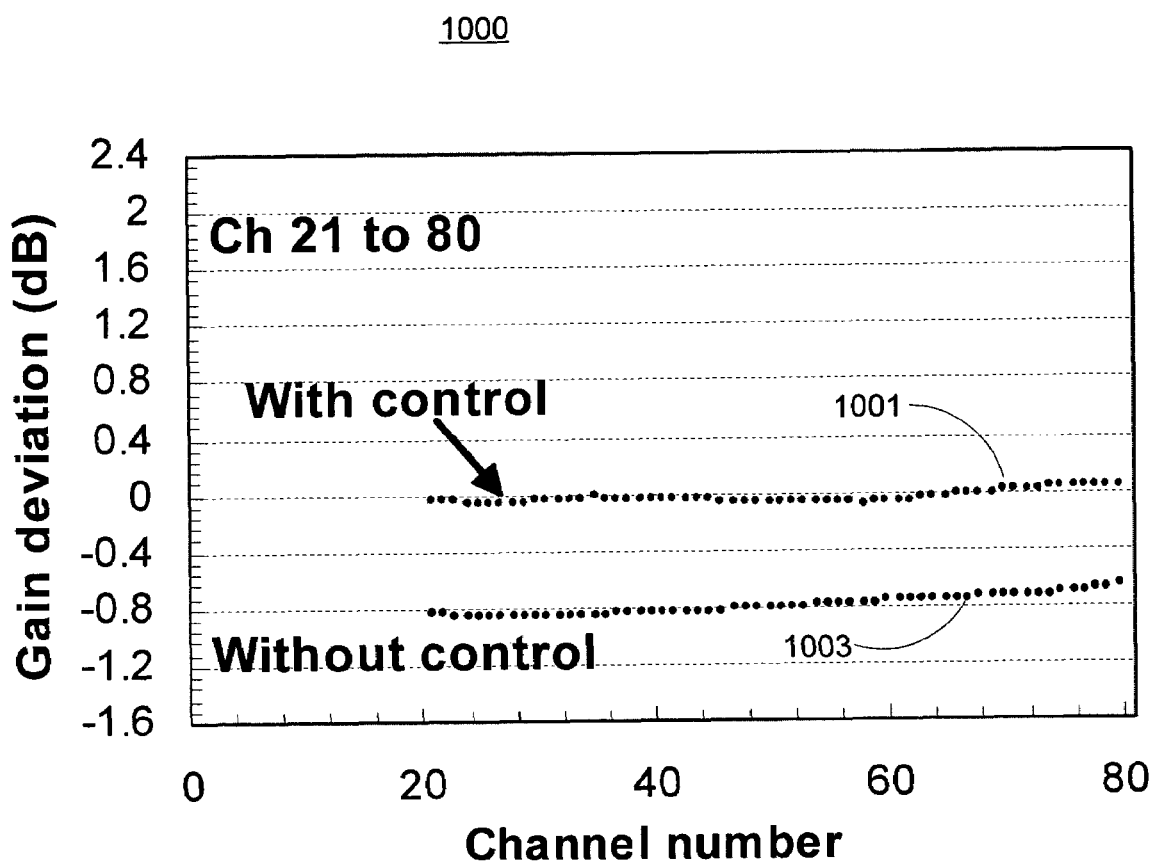
FIG. 10 shows a fourth example that compares gain deviation with and without dynamic gain control in accordance with an embodiment of the invention.
Figure 11:
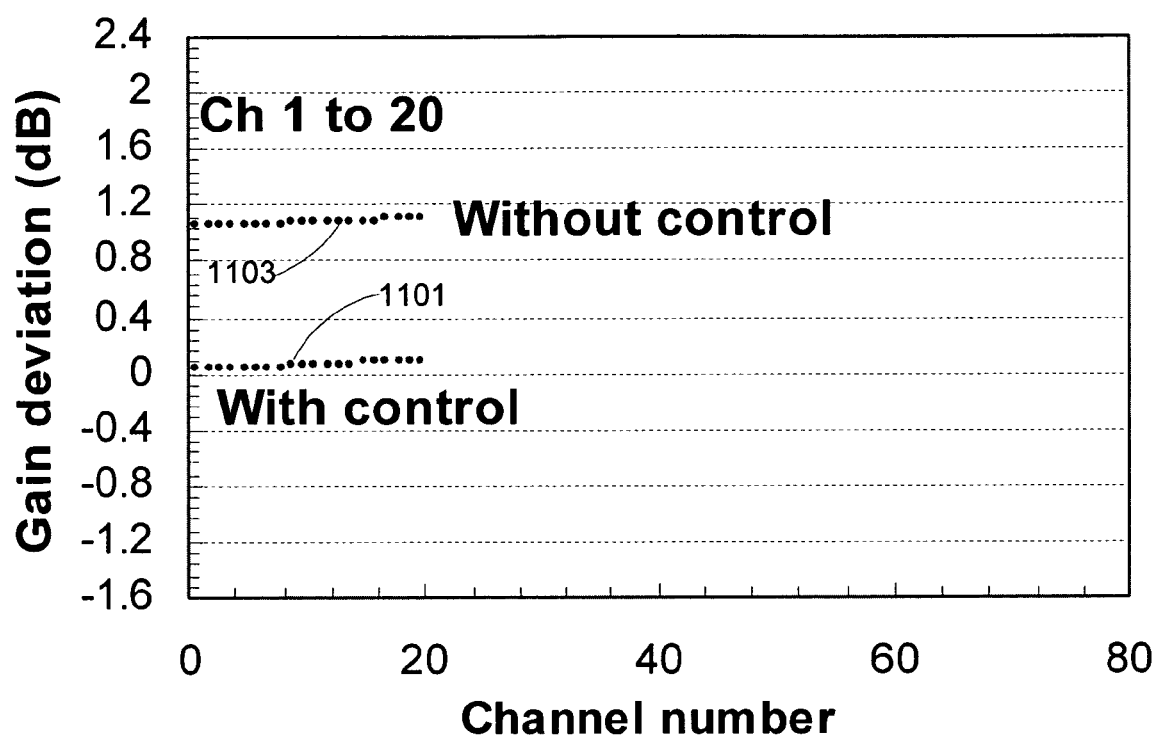
FIG. 11 shows a fifth example that compares gain deviation with and without dynamic gain control in accordance with an embodiment of the invention.
Figure 12:
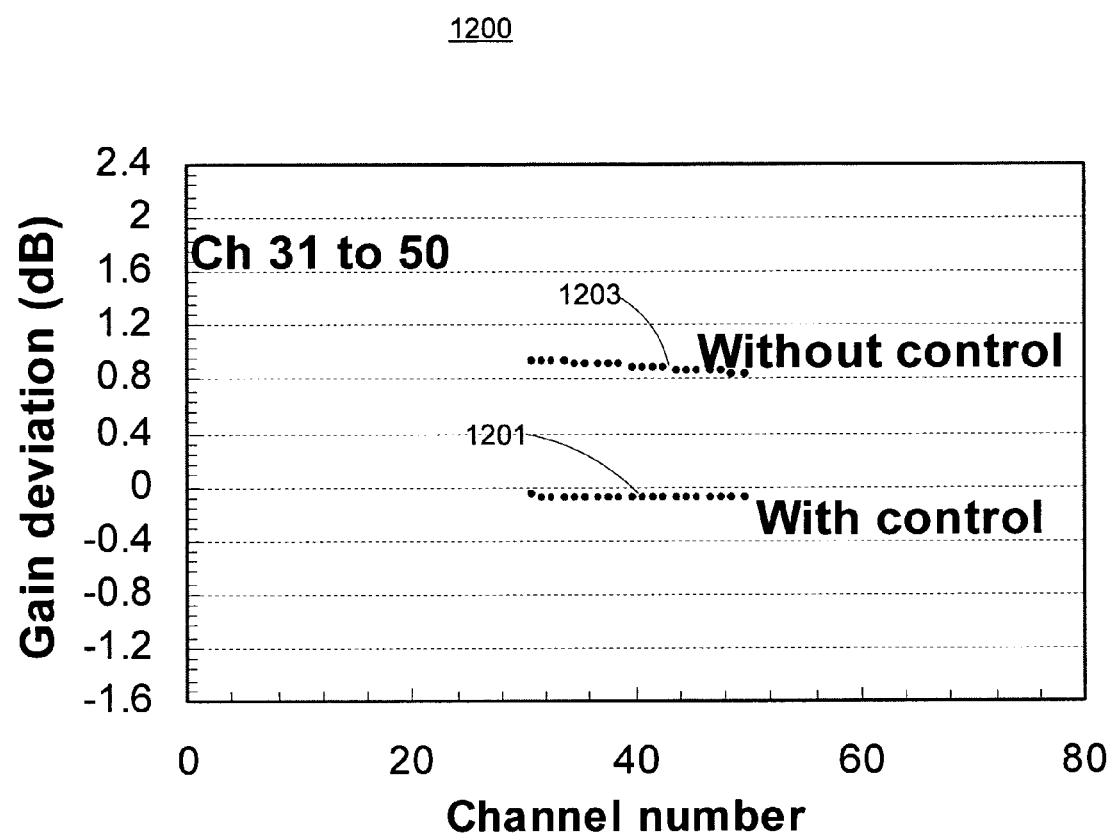
FIG. 12 shows a sixth example that compares gain deviation with and without dynamic gain control in accordance with an embodiment of the invention.
Figure 13:
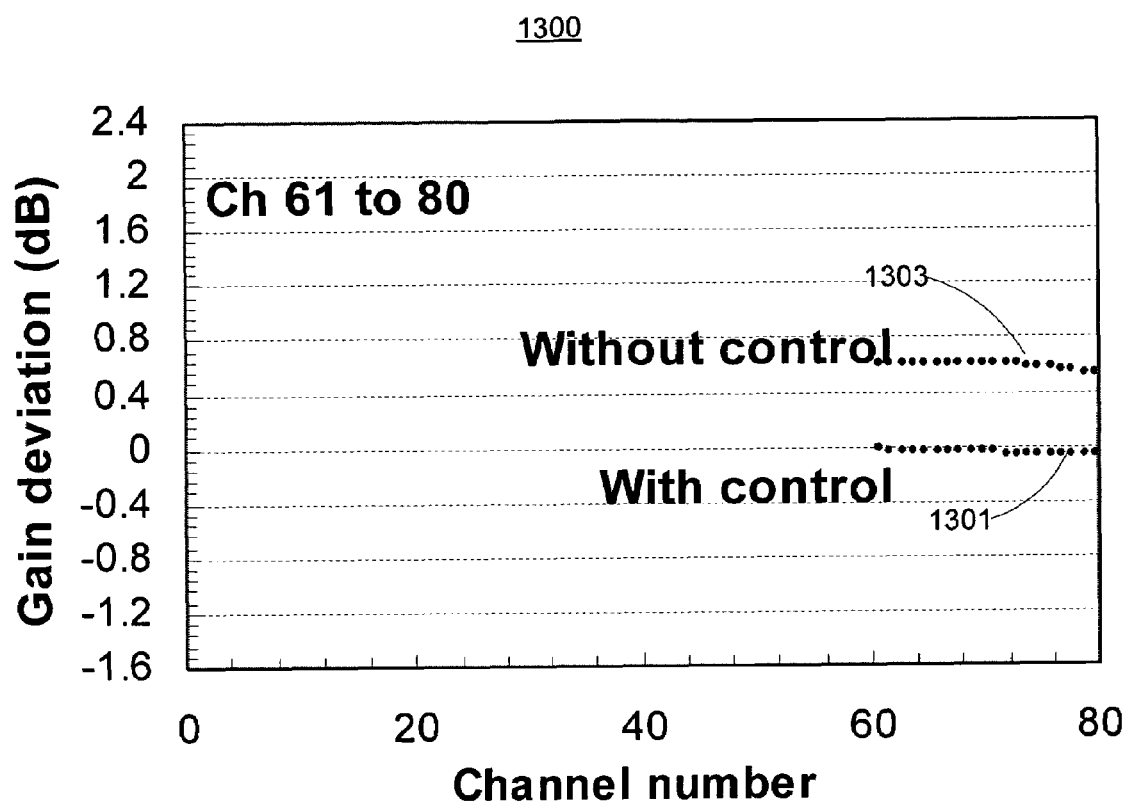
FIG. 13 shows a seventh example that compares gain deviation with and without dynamic gain control in accordance with an embodiment of the invention.
Figure 14:
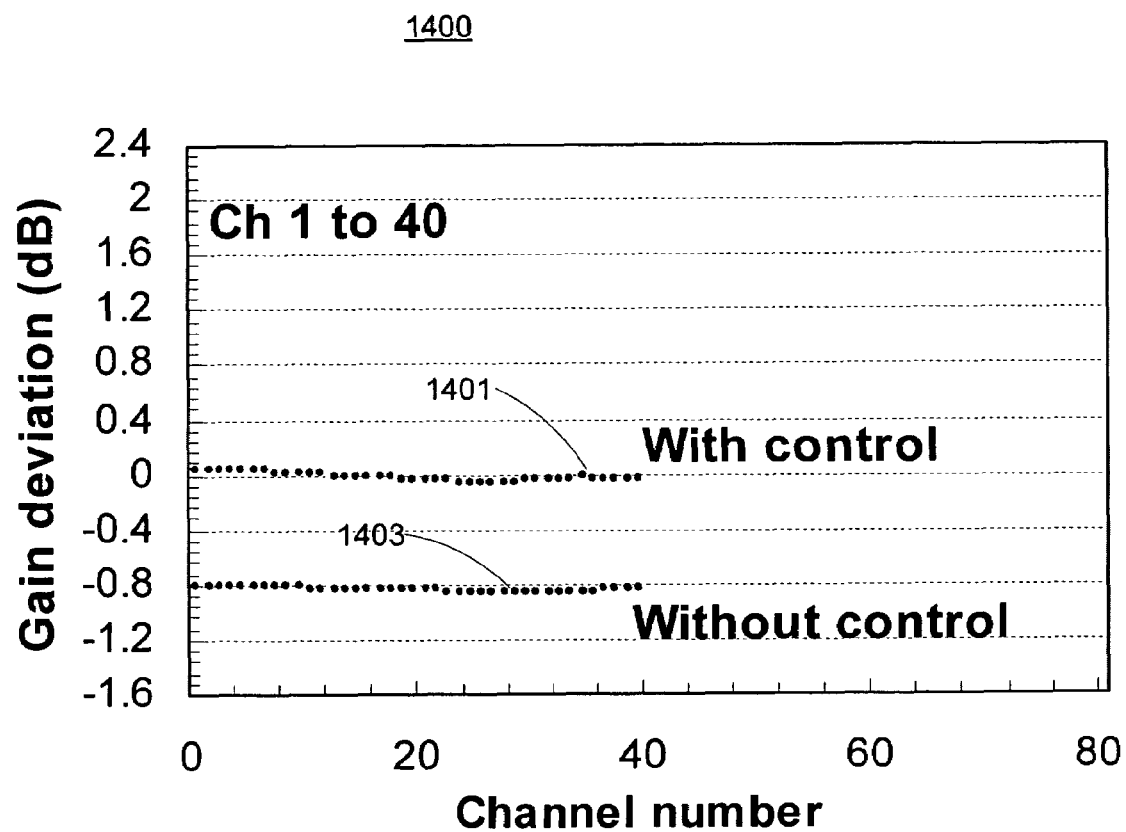
FIG. 14 shows an eighth example that compares gain deviation with and without dynamic gain control in accordance with an embodiment of the invention.

FIG. 8 shows a second example 800 that compares gain deviation with and without dynamic gain control with 1 active channel. FIG. 9 shows a third example 900 with 60 active channels. FIG. 10 shows a fourth example 1000 with channels 21-80 active. FIG. 11 shows a fifth example 1100 with 20 active channels. FIG. 12 shows a sixth example 1200 with channels 31-50 active. FIG. 13 shows a seventh example 1300 with channels 61-80 active. FIG. 14 shows an eighth example 1400 with 40 active channels. The above examples demonstrate the effectiveness of the embodiment shown in FIG. 5.

Figure 15:
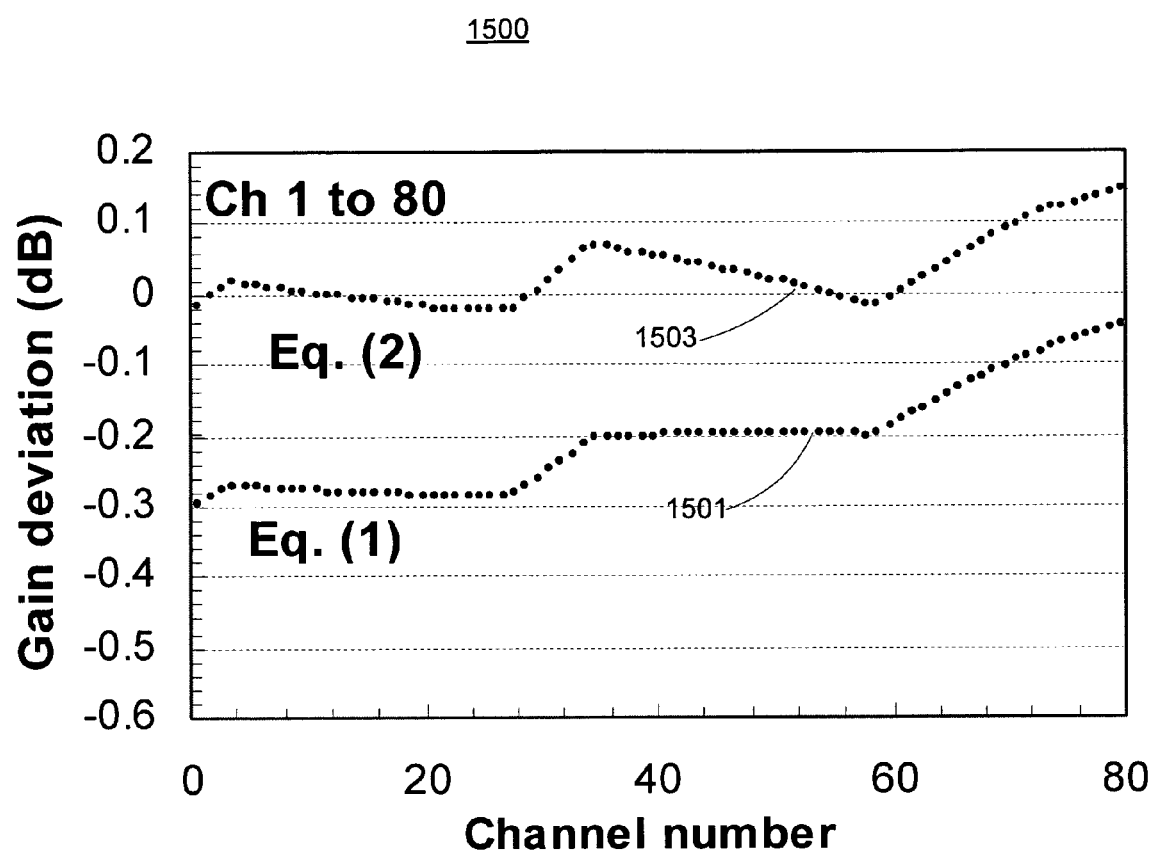
FIG. 15 shows a comparison of two control schemes in accordance with an embodiment of the invention.

FIG. 15 shows a plot 1500 comparing two control schemes with all channels (1-80) active in accordance with an embodiment of the invention. One observes that, while both schemes have the capability to suppress the signal gain deviation effectively (peak gain deviation is suppressed from −1.6 dB to 0.15 dB by using EQ. 2, and from −1.6 dB to −0.3 dB by using EQ. 1), the algorithm based on EQ. 2 appears to be better than the algorithm based on EQ. 1. This observation is due to the fact the target Raman gain (10.2±0.3 dB) is not sufficiently small. Simulations were performed to investigate the impact of K on the performance of dynamic gain control. Numerical results suggest that, for a purely L-band/C-band system, K=2 is a preferable choice, because a further increase of K only gives minor performance improvement but may increase cost considerably. On the contrary, choosing K=1 is acceptable depending on the system requirement—the peak gain deviation can be suppressed to be below 0.3 dB with K=1 while can be suppressed to be below 0.2 dB with K=2 for this specific WDM system. If one chooses K=1, the dynamic gain control circuit can be simplified with respect to apparatus 500 as shown in FIG. 5. The above investigations are based on a distributed RFA, although a similar approach is also applicable to a discrete RFA, in which only the fiber length and fiber type are different.

Figure 16:
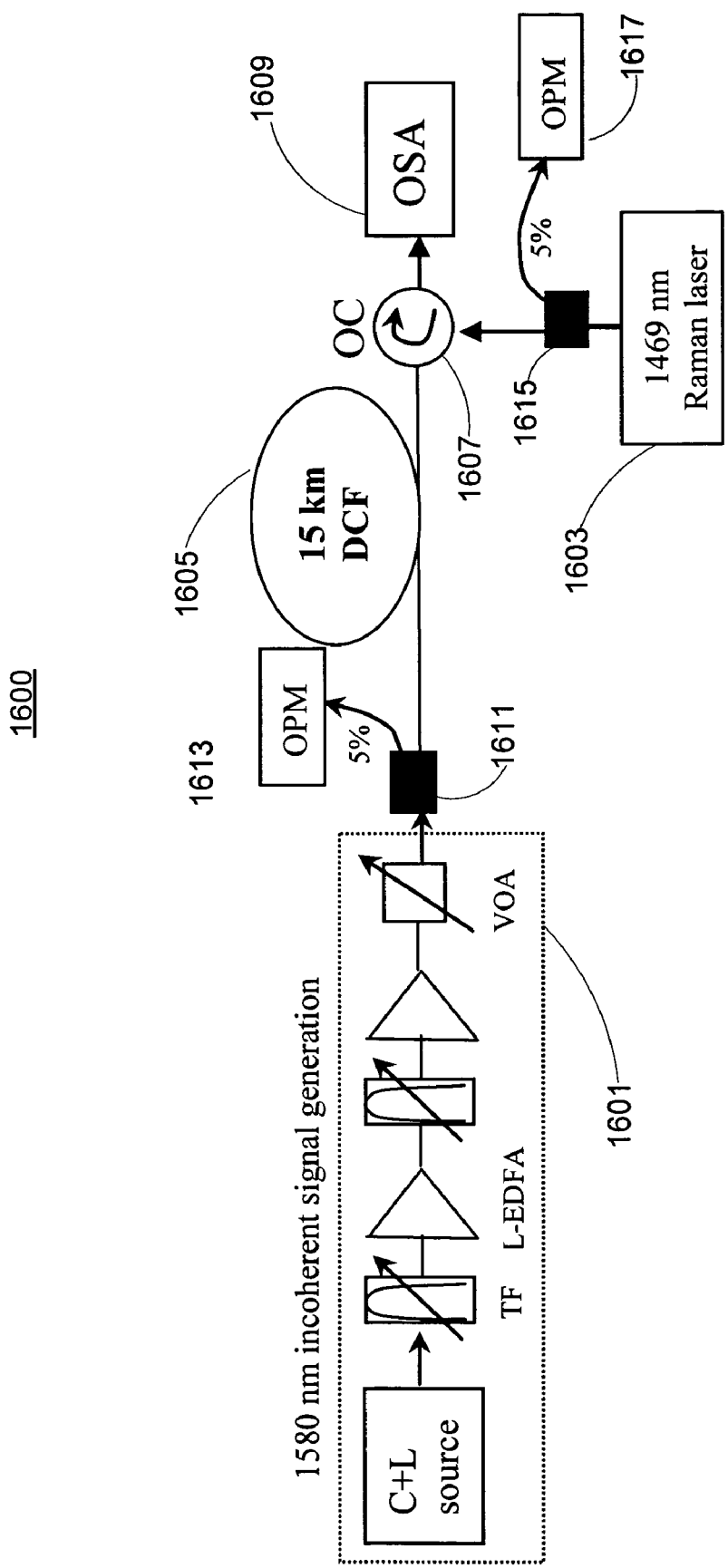
FIG. 16 shows an experimental set up for a backward-pumped Raman fiber amplifier in accordance with an embodiment of the invention.

FIG. 16 shows an experimental setup 1600 for a backward-pumped Raman fiber amplifier for investigating the relationship between the required pump power adjustment and the input signal power variation in accordance with an embodiment of the invention. Experimental results suggest a similar linear relationship (as shown in FIGS. 17 and 18) for a backward-pumped RFA as for a forward-pumped RFA (as previously discussed with FIGS. 3 and 4.

Figure 17:
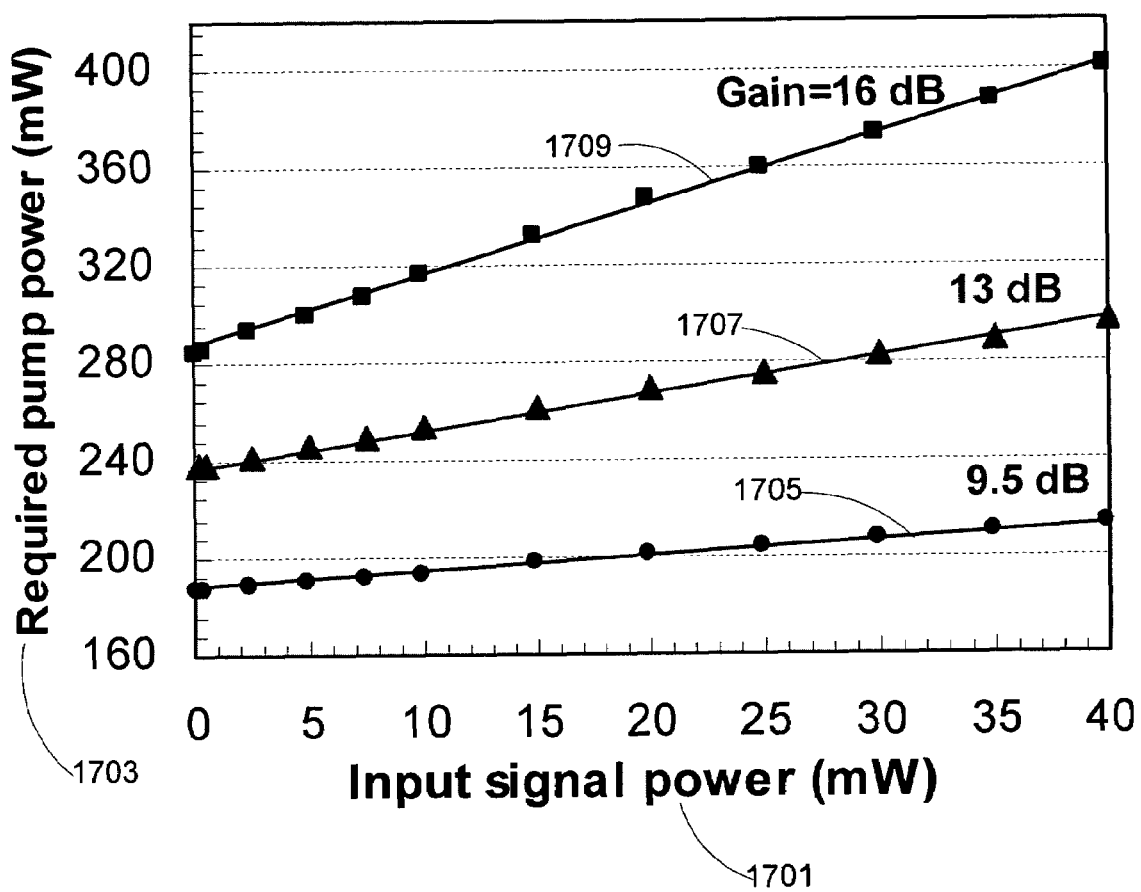
FIG. 17 shows Raman pump powers in a linear scale as a function of the input signal power in a linear scale for a backward-pumped Raman fiber amplifier in accordance with an embodiment of the invention.
Figure 18:
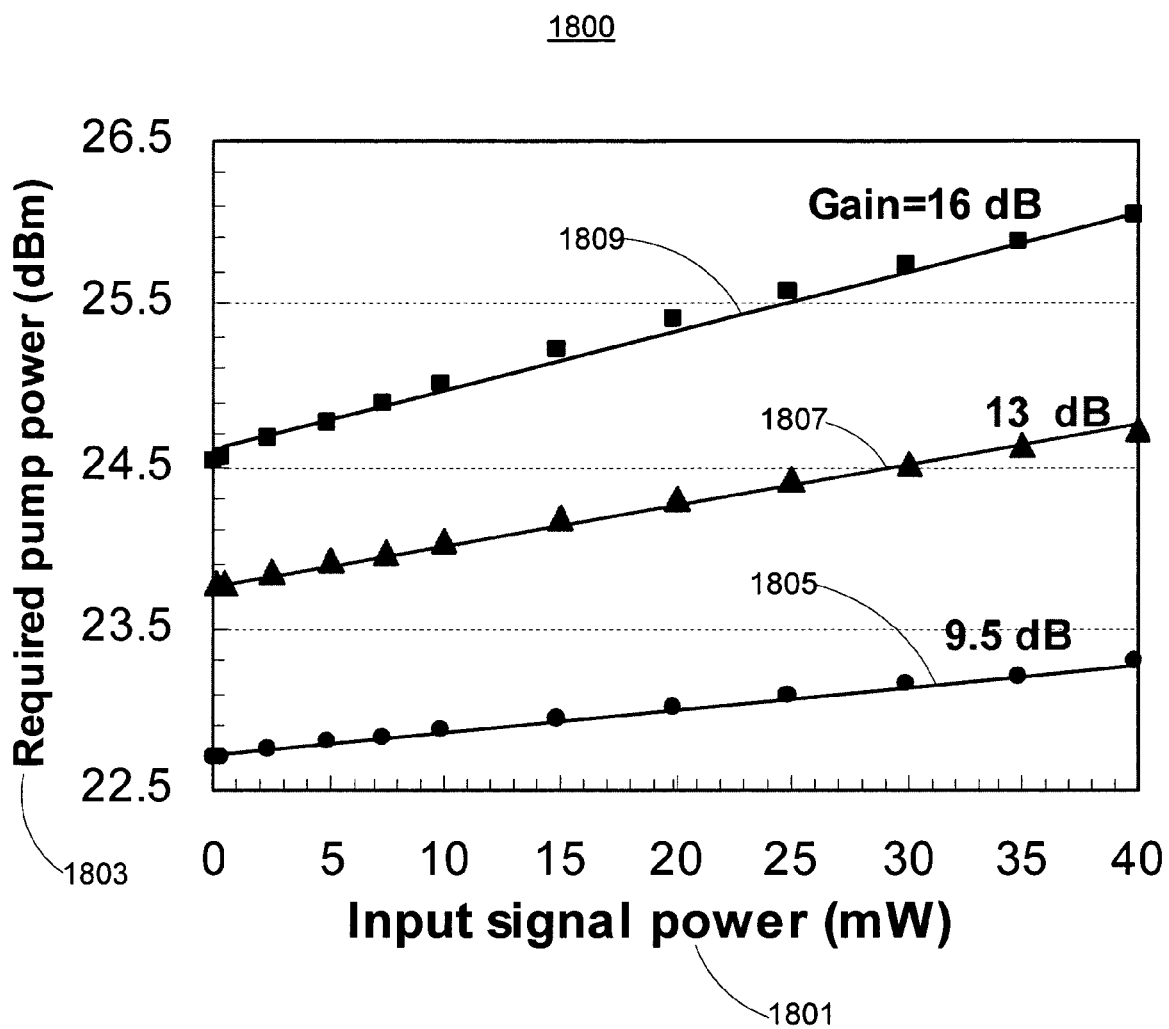
FIG. 18 shows Raman pump powers in a decibel scale as a function of the input signal power in a linear scale for a backward-pumped Raman fiber amplifier in accordance with an embodiment of the invention.

FIG. 17 shows a function 1700 in which Raman pump power in a linear scale is a function of the input signal power in a linear scale for a backward-pumped Raman fiber amplifier in accordance with an embodiment of the invention. FIG. 18 shows a function 1800 in which Raman pump power in a decibel scale is a function of the input signal power in a linear scale for a backward-pumped Raman fiber amplifier in accordance with an embodiment of the invention.

Figure 19:
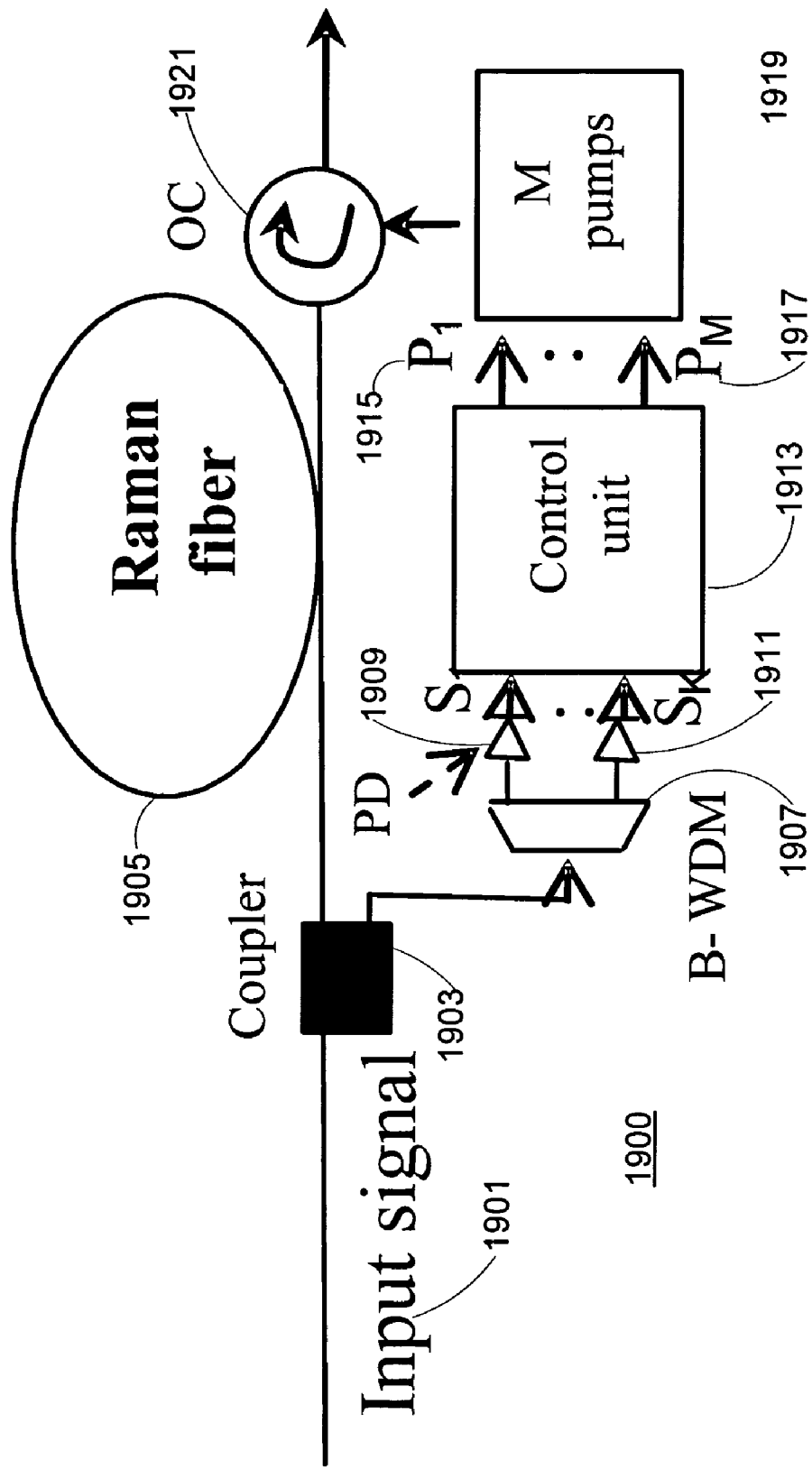
FIG. 19 shows a backward-pumped Raman fiber amplifier in accordance with an embodiment of the invention.
Figure 20:
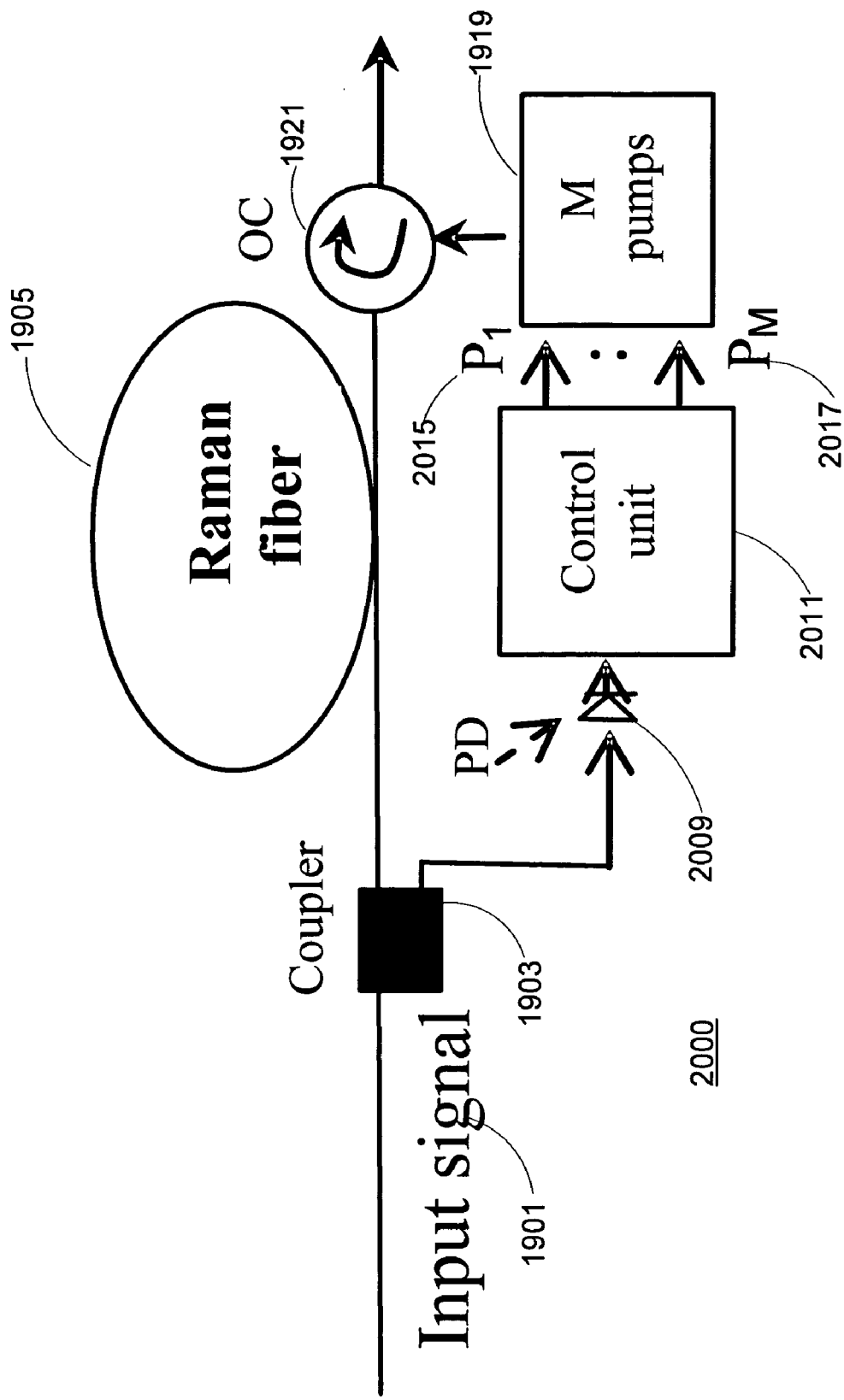
FIG. 20 shows a backward-pumped Raman fiber amplifier in accordance with an embodiment of the invention.

As with a forward pumped RFA, an embodiment of the invention utilizes one of two approximate linear relationships between the input signal power variations and the required pump power adjustments for the backward-pumped RFA's that are shown in FIGS. 19 and 20. Moreover, the linear relations are relations that are applicable to fiber systems that utilize both a forward-pumped RFA as well as a backward-pumped RFA.

Embodiments of the invention are not limited to control schemes that utilize linear functions corresponding to EQ. 1 or EQ. 2. Other complicated functions (linear or non-linear) that relate the input signal power variations directly to the required pump power adjustments are also applicable. As an example, the input signal power variations can be separated into several power regions. Within each region, linear function (EQ. 1) or (EQ. 2) is used to connect the required pump power adjustment to the input signal power variation, but the linear coefficients are allowed to be different between different power regions. A corresponding control algorithm may provide a better gain deviation suppression but at the cost of control speed and complexity.

FIG. 19 shows a backward-pumped Raman fiber amplifier 1900 in accordance with an embodiment of the invention. RFA 1900 incorporates a dynamic gain control circuit using EQ. 1 or EQ. 2 as the deterministic control algorithm for a backward-pumped discrete RFA is shown in FIG. 19. (RFA 2000 is the simplified version for the case when K=1, where the Raman fiber can be a conventional DCF or some special high nonlinear fiber.) Because a discrete RFA has much shorter fiber length than a distributed RFA, the gain transients experienced by a backward-pumped discrete RFA during channel add/drop can be significantly faster than a backward-pumped distributed RFA. Due to its deterministic nature (one-step), typically the control circuits shown in FIGS. 19 and 20 are inherently faster than the conventional methods based on a closed feedback loop, which usually needs several control cycles to stabilize the signal gain. With an embodiment of the invention, the control speed can be further improved by adding a proper electrical delay inside the control circuit to optimize the timing of the required pump power adjustment relative to the input signal power variation. As for the control algorithm, one observes that the algorithm based on EQ. 1 typically performs better than the algorithm based on EQ. 2 as illustrated by FIGS. 17 and 18. This observation is different from a forward-pumped RFA, where EQ. 2 typically performs better than EQ. 1. The underlying reason is due to the observation that pump depletion for a backward-pumped RFA occurs mostly close to the fiber end; therefore, exponential fiber loss plays a much less important role in the pump depletion than a forward-pumped Raman amplifier, in which the pump depletion occurs in a much longer fiber length.

Referring to FIG. 19, a portion the input power from input signal 1901 is provided by coupler 1903 to B-WDM 1907. Photodiodes 1909-1911 measure input power variations (PD) for each of the K wavelength regions. Control unit 1913 determines the pump power adjustments 1915-1917 using either EQ. 1 or EQ. 2. M pumps 1919 inject power into Raman fiber 1905 in the backward direction through optical circulator (OC) 1921.

Backward-pumped Raman fiber amplifier 2000, as shown in FIG. 20, is similar to backward-pumped Raman fiber amplifier 1900; however, with backward-pumped Raman fiber amplifier 2000, K=1 (i.e., there is one wavelength region). Consequently, control unit 2013 processes the input power variation (PD) for one wavelength region through photodiode 2009. Control unit 2013 controls M pumps 1919 by providing the pump power adjustments 2015-2017 to M pumps 1919.

Figure 21:
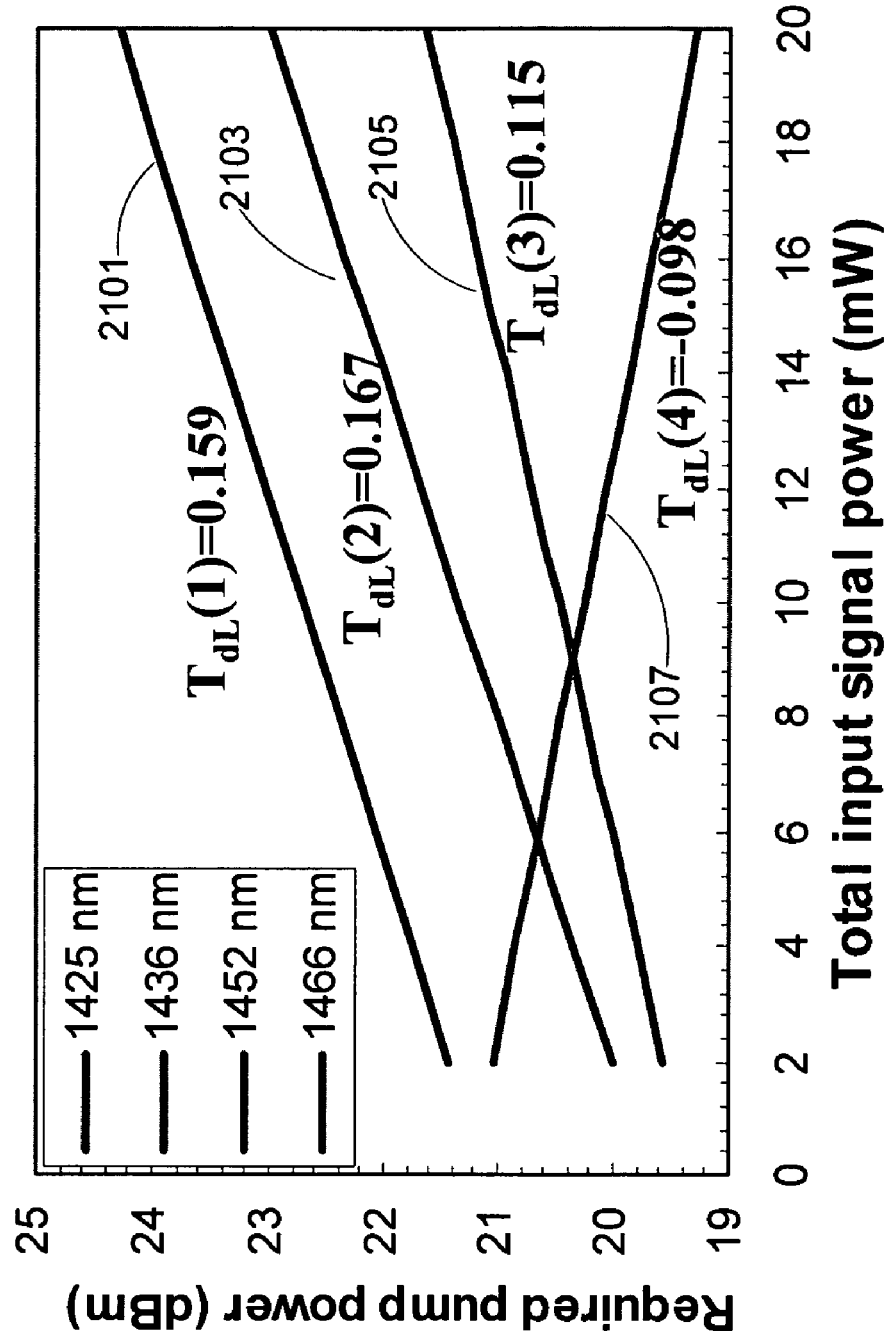
FIG. 21 illustrates an example of dynamic gain control for a forward-pumped Raman fiber amplifier in accordance with an embodiment of the invention.
Figure 22:
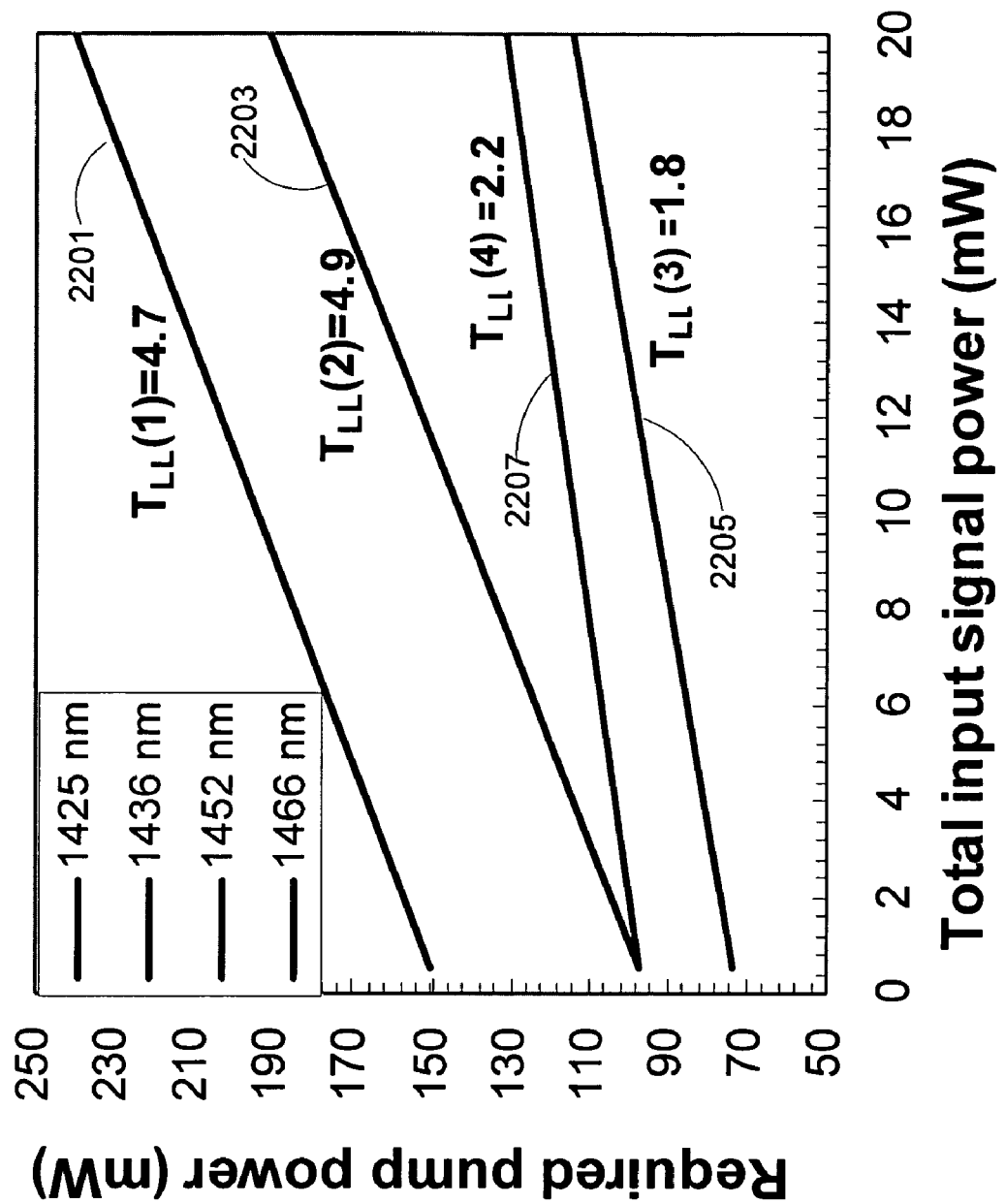
FIG. 22 illustrates an example of dynamic gain control for a backward-pumped Raman fiber amplifier in accordance with an embodiment of the invention.

FIGS. 21 and 22 provide examples that illustrate the above discussion. FIG. 21 illustrates an example of dynamic gain control for a forward-pumped Raman fiber amplifier in accordance with an embodiment of the invention. The following linear functions are used:

$$P_L(j, t) \approx P_{L0}(j) + \sum_{k=1}^{K} T_{LL}(j, k)[S_L(k, t) - S_{L0}(k)] \quad \text{EQ. 3}$$

$$P_d(j, t) \approx P_{d0}(j) + \sum_{k=1}^{K} T_{dL}(j, k)[S_L(k, t) - S_{L0}(k)] \quad \text{EQ. 4}$$

where $P_L(j,t)$ denotes the required pump power in the linear unit of the $j^{th}$ pump at time instant t, $S_L(k,t)$ denotes the detected input signal power in the kth wavelength region also in the linear unit. $S_{L0}(k)$ and $P_{L0}(j)$ denotes the corresponding input signal power and pump power at the reference operation point. The subscript L and d in EQ. 3 and EQ. 4 denote linear scale and logarithmic scale, respectively. EQ. 4 appears to be preferable for a forward-pumped Raman fiber amplifier.

In the example shown in FIG. 21, K=1, corresponding to a four-wavelength forward-pumped Raman fiber amplifier with 80 km of TW-Reach transmission fiber functions as the gain medium. The pump wavelengths are 1425, 1436, 1452 and 1466 nm. Full load (which is referred as the reference point) is configured as: 40 channel 100 GHz-spaced C-band signal, 1530 nm to 1561 nm, −3 dBm/channel input signal power, and a target Raman gain of 14±0.6 dB across the C-band.

The example utilizes the following linear control equation:

$$P_d(j,t) \approx P_{d0}(j) + T_{dL}(j)[S_L(t) - S_0] \text{ where } j=1,2,3,4 \quad \text{EQ. 5}$$

where $P_{d0}(1)$=24.3 dBm, $P_{d0}(2)$=23.0 dBm, $P_{d0}(3)$=21.63 dBm, and $P_{d0}(4)$=19.3 dBm and $S_{L0}$=20 mW.

Referring to FIG. 21, plot 2101 corresponds to the first pump (1425 nm), plot 2103 corresponds to the second pump (1436 nm), plot 2105 corresponds to the third pump (1452 nm), and plot 2107 corresponds to the fourth pump (1466 nm). The linear coefficients $T_{dL}(1)$, $T_{dL}(2)$, $T_{dL}(3)$, and $T_{dL}(4)$ are determined to be 0.159, 0.167, 0.115, and 0.098, respectively.

FIG. 22 illustrates an example of dynamic gain control for a backward-pumped Raman fiber amplifier in accordance with an embodiment of the invention. The following dynamic control equations are used:

$$P_L(j, t) \approx P_{L0}(j) + \sum_{k=1}^{K} T_{LL}(j, k)[S_L(k, t-T) - S_{L0}(k)] \quad \text{EQ. 6}$$

$$P_d(j, t) \approx P_{d0}(j) + \sum_{k=1}^{K} T_{dL}(j, k)[S_L(k, t-T) - S_{L0}(k)] \quad \text{EQ. 7}$$

where $P_L(j,t)$ denotes the required pump power in the linear unit of the $j^{th}$ pump at time instant t, $S_L(k,t)$ denotes the detected input signal power in the $k^{th}$ wavelength region also in the linear unit. $S_{L0}(k)$ and $P_{L0}(j)$ denotes the corresponding input signal power and pump power at the reference operation point. T denotes the introduced time delay between the pump power adjustment and the input signal power variation, roughly equal to the propagation time of the signal in the fiber. The subscript L and d in EQ. 6 and EQ. 7 denote linear scale and logarithmic scale, respectively. EQ. 6 appears to be preferable for a backward-pumped Raman fiber amplifier.

In the example shown in FIG. 22, K=1. The example corresponds to a four-wavelength backward-pumped discrete Raman fiber amplifier with 12 km of dispersion compensating fiber as the gain medium. The pump wavelengths are 1425, 1436, 1452 and 1466 nm. Full load (referred as the reference point) is configured as: 40 channel 100 GHz-spaced C-band signal, 1530 to 1561 nm, −3 dBm/channel input signal power. The target Raman gain is 16±0.6 dB across the C-band.

Figure 23:
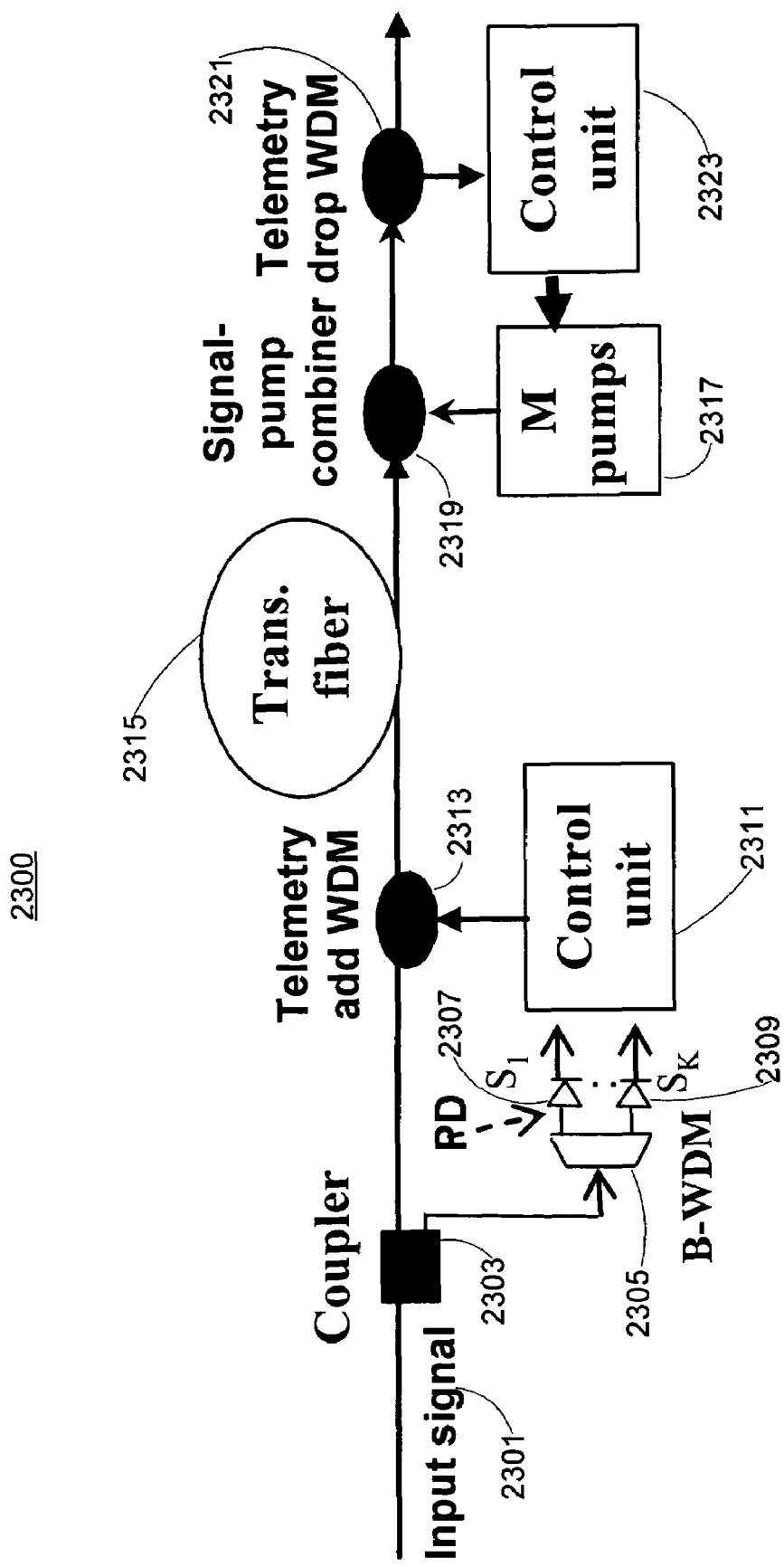
FIG. 23 shows a backward-pumped Raman fiber amplifier in accordance with an embodiment of the invention.

The example uses the following linear control equation:

$$P_L(j,t) \approx P_{L0}(j) + T_{LL}(j)[S_L(t) - S_0] \text{ } j=1,2,3,4 \quad \text{EQ. 7}$$

where $P_{L0}(1)$=246 mW, $P_{L0}(2)$=197.2 mW, $P_{L0}(3)$=122 mW, and $P_{L0}(4)$=140.6 mW $S_{L0}$=20 mW FIG. 23 shows a backward-pumped Raman fiber amplifier in accordance with an embodiment of the invention. Apparatus 2300 supports a geographical separation of the detection of the input power variation (determined by coupler 2303, B-WDM 2305, photodiodes 2307-2309, control unit 2311) and the injection of power by M pumps 2317. In the embodiment shown in FIG. 23, a portion of power from input signal 2301 is coupled by coupler 2303 into B-WDM 2305 and processed by control unit 2311. Because M pumps 2317 are geographically separated from control unit 2311, control information from control unit 2311 to control unit 2323 is sent over a telemetry channel using transmission fiber 2315, WDM 2313 and WDM 2321. (Transmission fiber 2315 also supports transmission of the optical signal channels.) The telemetry channel may be the conventional optical supervisory channel that is already used in most of the commercial WDM system. Using the control information, control unit 2323 adjusts the injected power of M pumps 2317 into combiner 2319. One of the following dynamic control functions is used in designing the backward-pumped Raman amplifier shown in FIG. 23.

$$P_L(j, t) \approx P_{L0}(j) + \sum_{k=1}^{K} T_{LL}(j, k)[S_L(k, t - T) - S_{L0}(k)] \quad \text{EQ. 9}$$

$$P_d(j, t) \approx P_{d0}(j) + \sum_{k=1}^{K} T_{dL}(j, k)[S_L(k, t - T) - S_{L0}(k)] \quad \text{EQ. 10}$$

where $P_L(j,t)$ denotes the required pump power in the linear unit of the $j^{th}$ pump at time instant t, $S_L(k,t)$ denotes the detected input signal power in the $k^{th}$ wavelength region also in linear units. $S_{L0}(k)$ and $P_{L0}(j)$ denotes the corresponding input signal power and the pump power at the reference operation point. T denotes the introduced time delay between the pump power adjustment and the input signal power variation, roughly equal to the propagation time of the signal in the transmission fiber. The subscript L and d in EQ. 9 and EQ. 10 denote linear scale and logarithmic scale, respectively. EQ. 9 provides performance that is preferable for a backward-pumped Raman fiber amplifier.

Figure 24:
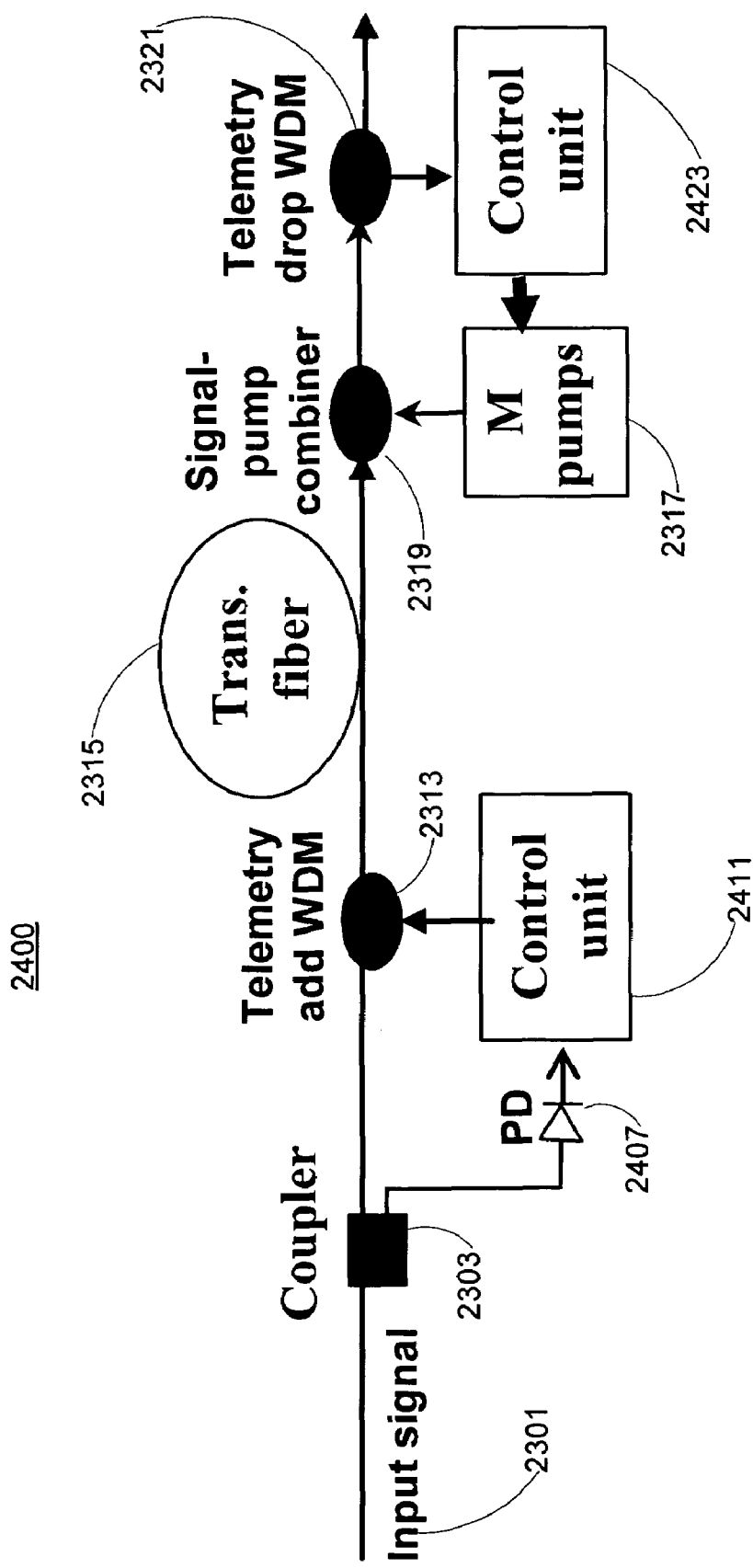
FIG. 24 shows a backward-pumped Raman fiber amplifier in accordance with an embodiment of the invention.

FIG. 24 shows a backward-pumped Raman fiber amplifier in accordance with an embodiment of the invention. Apparatus 2400 is similar to apparatus 2300; however, K=1. Consequently, only one photodiode (photodiode 2407) is needed to detect input power variations (PD). Control unit 2411 processes the detected input power variations in accordance with either EQ. 11 or EQ. 12 and sends control information to control unit 2423 over a telemetry channel on transmission fiber 2315.

$$P_L(j,t) \approx P_{L0}(j) + T_{LL}(j)[S_L(t-T) - S_{L0}] \quad \text{EQ. 11}$$

$$P_d(j,t) \approx P_{d0}(j) + T_{dL}(j)[S_L(t-T) - S_{L0}] \quad \text{EQ. 12}$$

EQ. 11 provides performance that is preferable with respect to EQ. 12 for a backward-pumped Raman fiber amplifier.

Embodiments of the invention support dynamic control of both a forward-pumped RFA and a backward-pumped RFA in an optical fiber system and Erbium doped fiber or waveguide amplifiers.

Figure 25:
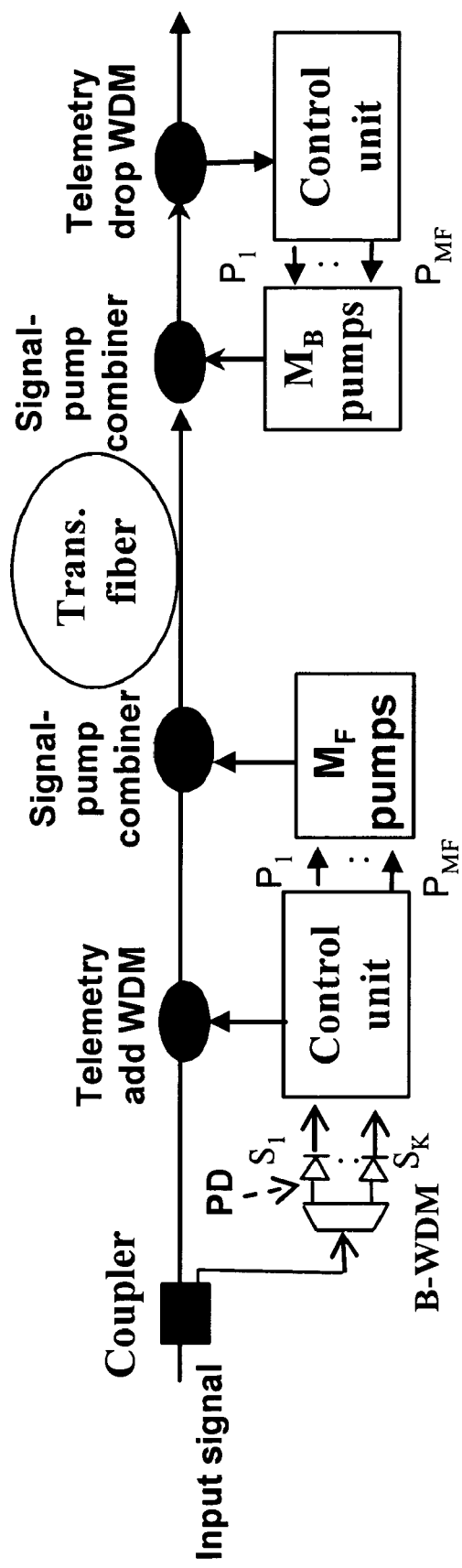
FIG. 25 shows an optical fiber system that utilizes dynamic control for both a forward-pumped Raman fiber amplifier and a backward Raman fiber amplifier in accordance with an embodiment of the invention.

FIG. 25 shows an optical fiber system that utilizes dynamic control for both a forward-pumped Raman fiber amplifier and a backward Raman fiber amplifier in accordance with an embodiment of the invention. One of the following two gain control functions is selected to control the gain of the forward-pumped Raman amplifier:

$$P_L^F(j, t) \approx P_{L0}(j) + \sum_{k=1}^{K} T_{LL}^F(j, k)[S_L(k, t) - S_{L0}(k)] \quad \text{EQ. 13}$$

$$P_d^F(j, t) \approx P_{d0}(j) + \sum_{k=1}^{K} T_{dL}^F(j, k)[S_L(k, t) - S_{L0}(k)] \quad \text{EQ. 14}$$

Additionally, one of the following two gain control functions is selected to control the gain of the backward-pumped Raman amplifier:

$$P_L^B(j, t) \approx P_{L0}^B(j) + \sum_{k=1}^{K} T_{LL}^B(j, k)[S_L(k, t - T) - S_{L0}(k)] \quad \text{EQ. 15}$$

$$P_d^B(j, t) \approx P_{d0}^B(j) + \sum_{k=1}^{K} T_{dL}^B(j, k)[S_L(k, t - T) - S_{L0}(k)] \quad \text{EQ. 16}$$

where $P_L^F(j,t)$ denotes the required pump power in the linear unit of the $j^{th}$ forward pump at time instant t, $S_L(k,t)$ denotes the detected input signal power in the $k^{th}$ wavelength region also in the linear unit. $S_{L0}(k)$ and $P_{L0}^F(j)$ denotes the corresponding input signal power and forward pump power at the reference operation point. The subscript L and d in EQ. 13, EQ. 14, EQ. 15, and EQ. 16 denote a linear scale and a logarithmic scale. The superscript F and B denote the forward Raman pump and the backward Raman pump. T is the propagation time of the optical signal in the transmission fiber. EQ. 14 is preferable for the forward-pumped Raman pumps, and EQ. 15 is preferable for the backward Raman pumps. In addition, one can use an optical supervisory channel as the telemetry channel to send the input signal power information to the backward Raman pump control unit.

For a WDM system using both forward-pumped distributed Raman fiber amplifier and backward-pumped distributed Raman fiber amplifier as discussed above, the total Raman gain comes from three different sources: from the forward Raman pumps through signal-forward Raman pump interactions, from the other signals through signal-signal Raman interactions, and from the backward Raman pumps through signal-backward Raman pump interactions. Because the typical effective Raman interaction length is smaller than 40 km and a bi-directional-pumped Raman amplifier is necessary only when the span length is large (typically greater than 80 km). This implies that the gain due to the co-propagating forward Raman pumps and the gain due to the co-propagating other signal mainly comes from the first 40 km and the Raman gain due to the backward Raman pumps mainly comes form the final 40 km. As a result, one can treat a bidirectional-pumped distributed Raman amplifier as two separate amplifiers: a forward-pumped Raman amplifier followed by a backward-pumped Raman amplifier. The control equations EQ. 13 or EQ. 14 is used to control fast gain transient (sub-us) due to co-propagating signal-forward pump interactions and signal-signal Raman interactions while the control equation EQ. 15 and EQ. 16 is used to control relatively slow gain transient (sub-ms) due to signal-backward pump interactions. The control coefficients for both the forward-pumped Raman amplifier and the backward-pumped Raman amplifier can be predetermined either by numerical calculation using the measured basic fiber link parameters or by direct measurement using K predetermined input channel patterns as follows. First, one disables all the backward Raman pumps. For each of the K input patterns, one calculates or measures the required power adjustments of each of the MF forward Raman pumps based on a target forward Raman gain profile (include both the gain from the forward Raman pumps and the gain from the signal-signal Raman interaction). The sets of control coefficients for the forward-pumped Raman amplifier can then be obtained by substituting the measured individual forward pump power adjustments in accordance with the K channel patterns into EQ. 13 or EQ. 14. Second, one turns on both the forward Raman pumps and the backward Raman pumps. For each of the K channel patterns, one first adjusts the forward pump powers (already known from the first step), and then one measures the required power adjustment of each of the MB backward Raman pumps based on the total target Raman gain profile which includes the gain from the forward Raman pumps, from the signal-signal Raman interaction and from the backward Raman pumps. Substituting the measured individual backward pump power adjustments in accordance with the K channel patterns into EQ. 15 or EQ. 16, one then obtains the sets of control coefficients for the backward-pumped Raman amplifier.

Figure 26:
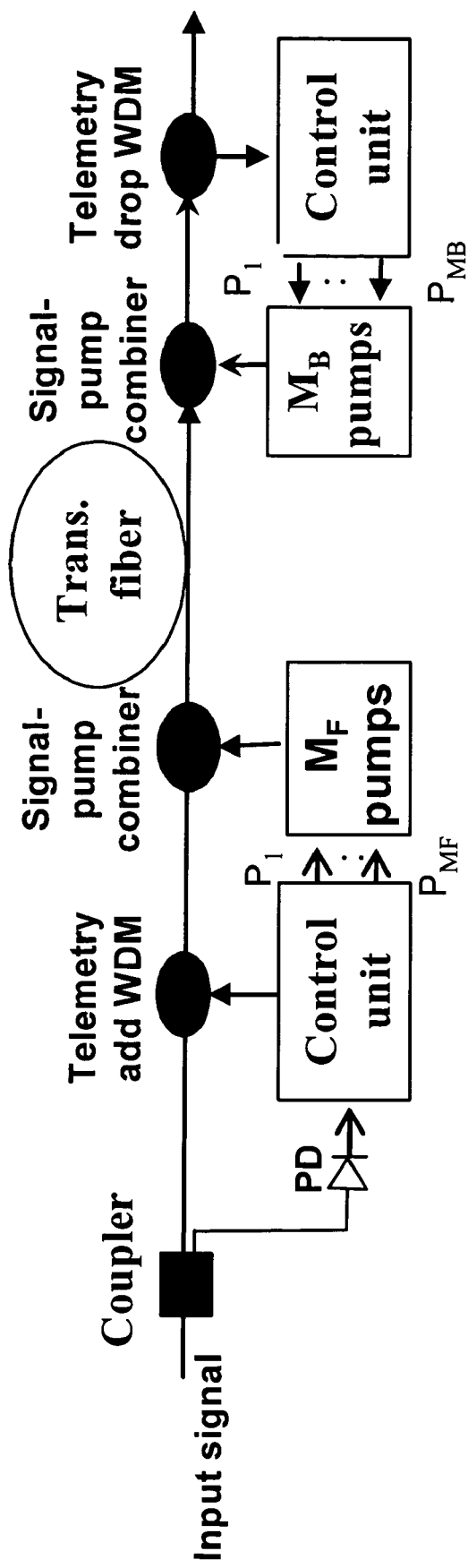
FIG. 26 shows an optical fiber system that utilizes dynamic control for both a forward-pumped Raman fiber amplifier and a backward Raman fiber amplifier in accordance with an embodiment of the invention.

FIG. 26 shows an optical fiber system that utilizes dynamic control for both a forward-pumped Raman fiber amplifier and a backward Raman fiber amplifier in accordance with an embodiment of the invention. The optical fiber system is similar to the optical fiber system as shown in FIG. 25; however, the number of wavelength regions is one (i.e., K=1).

Embodiments of the invention also support gain control for a conventional EDFA/EDWA amplifier, which can be viewed as a variant of the discrete Raman amplifier.

Finally, one observes that, if the transmission fiber is replaced by an Erbium doped fiber/waveguide, and the pump wavelength are chosen to be 980 nm and/or 1480 nm, the above considerations are also applicable to the dynamic gain control for an Erbium-doped fibber/waveguide amplifier.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry. Other hardware approaches such as DSP (digital signal processor) and FPGA (field programmable gate array) may also be used to implement the exemplary embodiments.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An optical fiber amplifier that supports a plurality of optical signal channels, comprising:
    at least one optical pump, each optical pump injecting optical power into an optical fiber at an assigned pump frequency;
    a partitioning unit that partitions the plurality of optical signal channels into at least one wavelength region and that provides an indication of a corresponding power variation for one of the at least one wavelength region;
    a control unit that determines a corresponding pump power adjustment for one of the at least one optical pump using a predetermined function, the predetermined function relating the corresponding power variation for said one of the at least one wavelength region to the corresponding pump power adjustment for said one of the at least one optical pump,
    said one of the at least one optical pump adjusting a corresponding power output in accordance with the corresponding pump power adjustment,
    wherein the predetermined function corresponds to a linear relationship between the corresponding pump power adjustment and the corresponding power variation of said one of the at least one wavelength region,
    wherein the partitioning unit comprises:
        a coupler that obtains coupled optical signals from the optical fiber, the coupled optical signals having a portion of a total power of the optical signal channels;
        a 1 by K band wavelength-division multiplexer (B-WDM) that partitions the coupled optical signals into the at least one wavelength region, wherein K is an integer greater or equal to one; and
        at least one photodetector that provides the indication of the corresponding power variation of said one of the at least one wavelength region,
    wherein
    1. the optical fiber amplifier comprises a backward-pumped optical fiber amplifier,
    2. the partitioning unit is situated at a first geographical location, and
    3. the at least one optical pump is situated at a second geographical location,
    the optical fiber amplifier further comprising:
        a communication channel that conveys control information from the first geographical location to the second geographical location to control the at least one optical pump.

2. The optical fiber amplifier of claim 1, the optical fiber amplifier comprising a Raman fiber amplifier (RFA).

3. The optical fiber amplifier of claim 1, the optical fiber amplifier comprising an Erbium doped fiber amplifier (EDFA).

4. The optical fiber amplifier of claim 1, the corresponding power variation being based on a channel loading of the optical fiber system.

5. The optical fiber amplifier of claim 1, a power adjustment scale corresponding to a linear scale.

6. An optical fiber amplifier that supports a plurality of optical signal channels, comprising:
    at least one optical pump, each optical pump injecting optical power into an optical fiber at an assigned pump frequency;
    a partitioning unit that partitions the plurality of optical signal channels into at least one wavelength region and that provides an indication of a corresponding power variation for one of the at least one wavelength region;
    a control unit that determines a corresponding pump power adjustment for one of the at least one optical pump using a predetermined function, the predetermined function relating the corresponding power variation for said one of the at least one wavelength region to the corresponding pump power adjustment for said one of the at least one optical pump;
    a power adjustment scale corresponding to a decibel scale;
    said one of the at least one optical pump adjusting a corresponding power output in accordance with the corresponding pump power adjustment,
    wherein the predetermined function corresponds to a linear relationship between the corresponding pump power adjustment and the corresponding power variation of said one of the at least one wavelength region, wherein
    1. the optical fiber amplifier comprises a backward-pumped optical fiber amplifier,
    2. the partitioning unit is situated at a first geographical location, and
    3. the at least one optical pump is situated at a second geographical location,
    the optical fiber amplifier further comprising:
        a communication channel that convex's control information from the first geographical location to the second geographical location to control the at least one optical pump.

7. A Raman fiber amplifier that supports N optical signal channels in an optical fiber system, comprising:
    M Raman pumps, each Raman pump injecting optical power into an optical fiber at an assigned pump frequency;

a partitioning unit that partitions the N optical signal channels into K wavelength regions and that provides an indication of a corresponding power variation for each wavelength region;
a control unit that determines a corresponding pump power adjustment for each said Raman pomp using a predetermined function, the predetermined function relating the corresponding power variation for each said wavelength region to the corresponding pump power adjustment for each said Raman pump,
each said Raman pump adjusting a corresponding power output in accordance with the corresponding pump power adjustment,
wherein the predetermined function corresponding to a linear relationship between the corresponding pump power adjustment and the corresponding power variation of each said wavelength region, wherein
1. the Raman fiber amplifier comprises a backward-pumped Raman fiber amplifier,
2. the partitioning unit is situated at a first geographical location, and
3. the M Raman pumps are situated at a second geographical location,
the Raman fiber amplifier further comprising:
a communication channel that conveys control information from the first geographical location to the second geographical location to control each said Raman pump.

8. The Raman fiber amplifier of claim 7, the partitioning unit comprising:
a coupler that obtains N coupled optical signals from the optical fiber, the N coupled optical signals having a portion of a total power of the N optical signal channels;
a 1 by K band wavelength-division multiplexer (B-WDM) that partitions the N coupled optical signals into the K wavelength regions; and
at least one photodetector that provides the indication of the corresponding power variation of each said wavelength region.

9. The Raman fiber amplifier of claim 7, further comprising:
another control unit that is located at the second geographical location, that receives the control information over the communications channel, and that controls the corresponding power output for each said Raman pump.

10. A Raman fiber amplifier that supports N optical signal channels in an optical fiber system, comprising:
M Raman pumps, each Raman pump injecting optical power into an optical fiber at an assigned pump frequency;
a partitioning unit that partitions the N optical signal channels into K wavelength regions and that provides an indication of a corresponding power variation for each wavelength region;
a control unit that determines a corresponding pump power adjustment for each said Raman pump using a predetermined function, the predetermined function relating the corresponding power variation for each said wavelength region to the corresponding pump power adjustment for each said Raman pump,
each said Raman pump adjusting a corresponding power output in accordance with the corresponding pump power adjustment,
wherein the predetermined function corresponding to a linear relationship between the corresponding pump power adjustment and the corresponding power variation of each said wavelength region, the predetermined function comprising:

$$\Delta P_L(j) \approx \sum_{k=1}^{K} T_{LL}(j,k)\Delta S_L(k),$$

wherein k corresponds to a $k^{th}$ wavelength region, wherein j corresponds to a $j^{th}$ Raman pump, $\Delta S_L(k)$ corresponds to the corresponding power variation for the $k^{th}$ wavelength region as linearly scaled, $\Delta P_L(j)$ corresponds to the corresponding pump power adjustment of the $j^{th}$ Raman pump as linearly scaled, and $T_{LL}(j,k)$ corresponds to a linear coefficient relating the corresponding pump power adjustment of the $j^{th}$ Raman pump and the corresponding power variation for the $k^{th}$ wavelength region.

11. The Raman fiber amplifier of claim 10, each linear coefficient being dependent on one of a plurality of power regions.

12. A Raman fiber amplifier that supports N optical signal channels in an optical fiber system, comprising:
M Raman pumps, each Raman pump injecting optical power into an optical fiber at an assigned pump frequency;
a partitioning unit that partitions the N optical signal channels into K wavelength regions and that provides an indication of a corresponding power variation for each wavelength region;
a control unit that determines a corresponding pump power adjustment for each said Raman pump using a predetermined function, the predetermined function relating the corresponding power variation for each said wavelength region to the corresponding pump power adjustment for each said Raman pump,
each said Raman pump adjusting a corresponding power output in accordance with the corresponding pump power adjustment,
wherein the predetermined function corresponding to a linear relationship between the corresponding pump power adjustment and the corresponding power variation of each said wavelength region, the predetermined function comprising:

$$\Delta P_d(j) \approx \sum_{k=1}^{K} T_{dL}(j,k)\Delta S_L(k),$$

wherein k corresponds to a $k^{th}$ wavelength region, wherein j corresponds to a $j^{th}$ Raman pump, $\Delta S_L(k)$ corresponds to the corresponding power variation for the $k^{th}$ wavelength region as linearly scaled, $\Delta P_d(j)$ corresponds to the corresponding pump power adjustment of the $j^{th}$ Raman pump as logarithmically scaled, and $T_{dL}(j,k)$ corresponds to a linear coefficient relating the corresponding pump power adjustment of the $j^{th}$ Raman pump and the corresponding power variation for the $k^{th}$ wavelength region.

13. The Raman fiber amplifier of claim 12, each of the linear coefficients being dependent on one of a plurality of power regions.

14. A forward-pumped Raman fiber amplifier that supports N optical signal channels transported by an optical fiber facility, comprising:
M Raman pumps, each Raman pump injecting optical power into the optical fiber facility at an assigned pump frequency;

a partitioning unit that partitions the N optical signal channels into K wavelength regions and that provides an indication of a corresponding power variation for each wavelength region;

a control unit for determining a corresponding pump power adjustment for each said Raman pump using a predetermined function, the predetermined function relating the corresponding power variation for each said wavelength region to the corresponding pump power adjustment for each said Raman pump, each said Raman pump adjusting a corresponding power output in accordance with the corresponding pump power adjustment, wherein the linear function comprises:

$$\Delta P_d(j) \approx \sum_{k=1}^{K} T_{dL}(j,k) \Delta S_L(k),$$

wherein k corresponds to a $k^{th}$ wavelength region, and wherein j corresponds to a $j^{th}$ Raman pump, $\Delta S_L(k)$ corresponds to the corresponding power variation for the $k^{th}$ wavelength region as linearly scaled, $\Delta P_d(j)$ corresponds to the corresponding pump power adjustment of the $j^{th}$ Raman pump as logarithmically scaled, and $T_{dL}(j,k)$ corresponds to a linear coefficient relating the corresponding pump power adjustment of the $j^{th}$ Raman pump and the corresponding power variation of the $k^{th}$ wavelength region; and a fiber delay line, between a coupling point of the partitioning unit to the optical fiber facility and an injection point of the M Raman pumps to the optical fiber facility, for compensating for a delay time associated with processing by the control unit.

\* \* \* \* \*